(12) United States Patent
Kwak et al.

(10) Patent No.: US 11,381,701 B2
(45) Date of Patent: Jul. 5, 2022

(54) METHOD FOR SUPPLYING POWER USING PRINTING APPARATUS, AND PRINTING APPARATUS FOR PERFORMING THE SAME

(71) Applicant: BIXOLON CO., LTD., Seongnam-si (KR)

(72) Inventors: Young Hwan Kwak, Hwaseong-si (KR); Dong Woo Kim, Yongin-si (KR); Junho Hwang, Suwon-si (KR); Gihwan Ahn, Seongnam-si (KR)

(73) Assignee: BIXOLON CO., LTD., Seongnam-si (KR)

( * ) Notice: Subject to any disclaimer, the term of this patent is extended or adjusted under 35 U.S.C. 154(b) by 0 days.

(21) Appl. No.: 16/839,524

(22) Filed: Apr. 3, 2020

(65) Prior Publication Data
US 2020/0236242 A1     Jul. 23, 2020

Related U.S. Application Data

(63) Continuation of application No. PCT/KR2019/009461, filed on Jul. 30, 2019.

(30) Foreign Application Priority Data

Jul. 30, 2018   (KR) .................. 10-2018-0088756
Aug. 1, 2018    (KR) .................. 10-2018-0090091

(51) Int. Cl.
*H04N 1/00* (2006.01)

(52) U.S. Cl.
CPC ..... *H04N 1/00907* (2013.01); *H04N 1/00307* (2013.01); *H04N 1/00896* (2013.01); *H04N 1/00899* (2013.01)

(58) Field of Classification Search
None
See application file for complete search history.

(56) References Cited

U.S. PATENT DOCUMENTS

| | | | |
|---|---|---|---|
| 6,526,516 B1 * | 2/2003 | Ishikawa | H04L 12/10 |
| | | | 713/340 |
| 11,209,881 B2 * | 12/2021 | Tanase | G06K 15/40 |

(Continued)

FOREIGN PATENT DOCUMENTS

| | | |
|---|---|---|
| JP | 11-243651 A | 9/1999 |
| JP | 2016-64521 A | 4/2016 |
| WO | 2017/176413 A1 | 10/2017 |

OTHER PUBLICATIONS

International Search Report for PCT/KR2019/009461 dated Nov. 13, 2019.

*Primary Examiner* — Henok Shiferaw
(74) *Attorney, Agent, or Firm* — Sughrue Mion, PLLC

(57) ABSTRACT

A printing apparatus supporting USB type-C includes: a USB type-C interface configured to support a connection with an external device; a printing unit configured to perform printing; and a controller configured to control the supply of power to the external device. The controller checks a reception power received from an external power source, predicts the estimated power consumption of at least one of the printing apparatus and the external device, determines a supply power to be transmitted to the external device based on the reception power and the estimated power consumption, and transmits the supply power to the external device via the USB type-C interface.

13 Claims, 28 Drawing Sheets

(56) References Cited

U.S. PATENT DOCUMENTS

| | | | |
|---|---|---|---|
| 2015/0264208 A1* | 9/2015 | Achiwa | H04N 1/00885 |
| | | | 358/1.15 |
| 2016/0267367 A1* | 9/2016 | Uno | B41J 3/44 |
| 2017/0293335 A1* | 10/2017 | Dunstan | H02J 7/00 |
| 2017/0346962 A1* | 11/2017 | Yamada | H04N 1/32122 |
| 2017/0368853 A1* | 12/2017 | Satake | B41J 23/00 |
| 2019/0199884 A1* | 6/2019 | Shimamura | H04N 1/00888 |
| 2019/0238706 A1* | 8/2019 | Sakai | H04N 1/00907 |
| 2020/0250501 A1* | 8/2020 | Yamamoto | G06F 1/266 |

* cited by examiner

METHOD FOR SUPPLYING POWER USING PRINTING APPARATUS, AND PRINTING APPARATUS FOR PERFORMING THE SAME

TECHNICAL FIELD

Embodiments disclosed herein relate to a method for controlling a printing apparatus and an apparatus for performing the same. In particular, embodiments relate to a method for supplying power to an external device by using a printing apparatus supporting USB type-C and a printing apparatus control system and method for providing information related to the occurrence of an error in a printing apparatus to a user.

BACKGROUND ART

Recently, the percentage at which USB type-C, which is the latest version of the USB standard, is applied to various types of electronic devices has increased. USB type-C supports not only data communication up to 10 Gbps and power transmission up to 100 W. Accordingly, an electronic device supporting USB type-C can perform data communication with another device connected via a USB type-C connection, and can supply or receive power to or from the other device.

In a system in which two or more electronic devices are connected via USB type-C and at least one of them is connected to an external power source, power may be distributed in such a manner that the electronic device connected to the power source uses part of power received from the power source and the rest of the power is transmitted to another electronic device via a USB type-C connection.

In connection with this, U.S. Pat. No. 9,189,184, which is a related art document, discloses a technology for supplying power to a printing apparatus via a USB.

Meanwhile, a printing apparatus is an apparatus for outputting data including text, an image, and/or the like to a print medium. The printing apparatus can perform a printing operation in response to a print request received from a user, and errors of printing operations can be generated by various causes.

In this case, a user can seek or search for solutions to respective error situations via a user manual provided when a printing apparatus is purchased, a manufacturer's webpages, or the like. However, there are limitations to a general user rapidly dealing with all error situations.

In particular, in the case of an industrial small-sized printing apparatus used in a business office, an appropriate solution needs to be provided such that a user can easily identify the cause of an error and rapidly solve the error in order to carry out smooth transactions.

Meanwhile, the above-described background technology corresponds to technical information that has been possessed by the present inventor in order to contrive the present invention or which has been acquired in the process of contriving the present invention, and can not necessarily be regarded as well-known technology which had been known to the public prior to the filing of the present invention.

DISCLOSURE

Technical Problem

Embodiments disclosed herein relate to a method for controlling a printing apparatus and an apparatus for performing the same. In particular, embodiments relate to a method and apparatus for supplying power, received from an external power source by a printing apparatus supporting USB type-C, to an external device connected via USB type-C and a printing apparatus control system and method for providing information related to the occurrence of an error in a printing apparatus to a user.

Technical Solution

There is provided a printing apparatus supporting USB type-C, the printing apparatus including: a USB type-C interface configured to support a connection with an external device; a printing unit configured to perform printing; and a controller configured to control the supply of power to the external device; wherein the controller checks the reception power received from an external power source, predicts the estimated power consumption of at least one of the printing apparatus and the external device, determines the supply power to be transmitted to the external device based on the reception power and the estimated power consumption, and transmits the supply power to the external device via the USB type-C interface.

Advantageous Effects

According to the above-described technical solution, the printing apparatus determines the supply power to be transmitted to an external device based on the results of the prediction of the estimated power consumptions of the printing apparatus and the external device (a host device) connected to the printing apparatus, thereby providing the advantage of efficiently distributing power, received from a power source, according to the situation.

Furthermore, the printing apparatus determines the supply power by considering both the minimum amount of power of the printing apparatus and the priorities of the printing apparatus and an external device, thereby allowing for the effect of increasing the appropriateness and flexibility of power distribution to be expected.

Furthermore, an effect is achieved in that a user may easily solve an error having occurred in the printing apparatus.

Furthermore, according to some embodiments, when a plurality of pieces of error information is detected, a plurality of pieces of solution information corresponding to the respective pieces of error information is selectively or sequentially provided based on priorities, and thus a user may efficiently solve error states having occurred in the printing apparatus.

Moreover, according to some embodiments, only an appropriate level of solution information may be efficiently provided according to a user.

The effects that can be obtained by the embodiments disclosed herein are not limited to the above-described effects, and other effects that have not been described above will be apparently understood by those having ordinary skill in the art, to which the present invention pertains, from the following description.

BEST MODE

Figure 1:
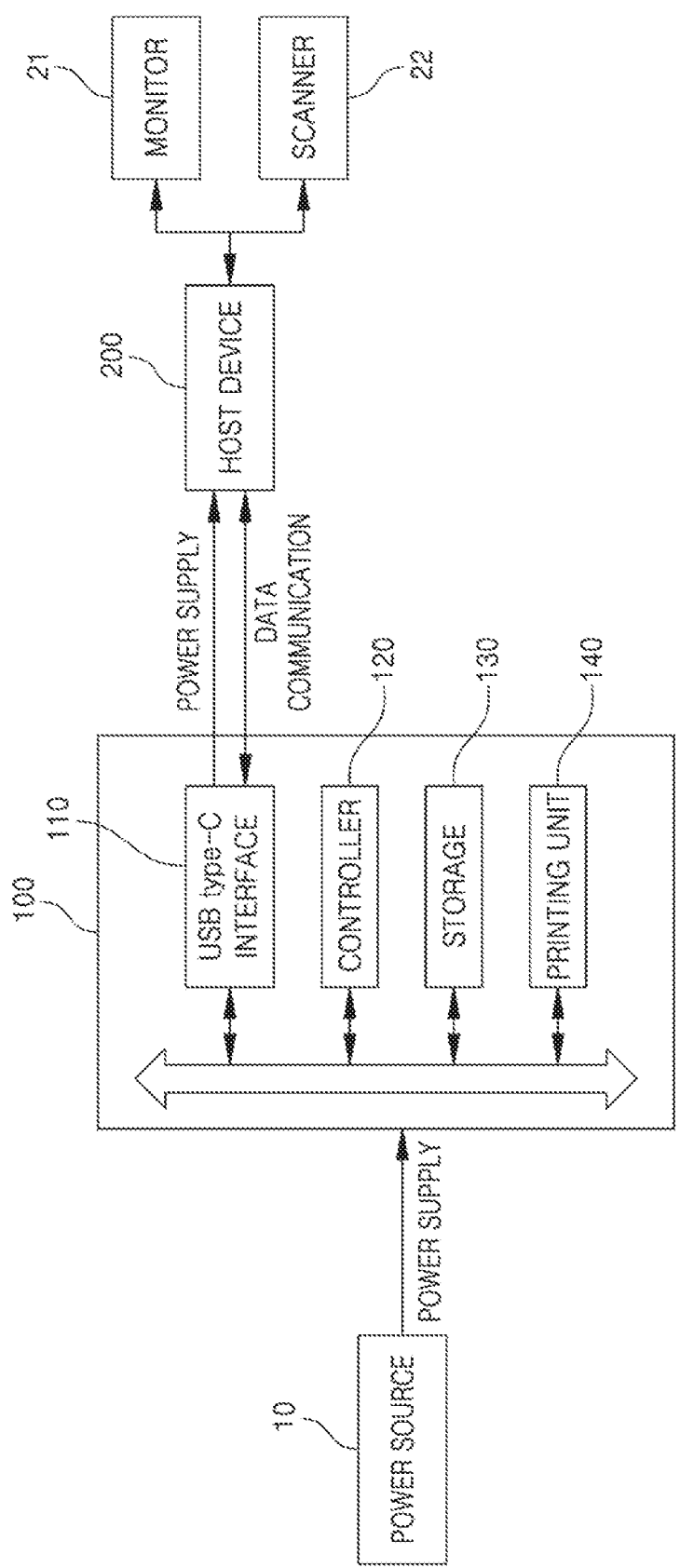
FIG. 1 is a diagram showing the configuration of a printing apparatus that transmits part of power, received from an external power source, to a host device via a USB type-C connection according to one embodiment.

As a technical solution for accomplishing the above objects, according to an embodiment, there is provided a printing apparatus supporting USB type-C, the printing apparatus including: a USB type-C interface configured to support a connection with an external device; a printing unit configured to perform printing; and a controller configured to control the supply of power to the external device; wherein the controller checks a reception power received from an external power source, predicts the estimated power consumption of at least one of the printing apparatus and the external device, determines the supply power to be transmitted to the external device based on the reception power and the estimated power consumption, and transmits the supply power to the external device via the USB type-C interface.

According to another embodiment, there is provided a method for supplying power by using a printing apparatus supporting USB type-C, the method including: checking a reception power received from an external power source by the printing apparatus; predicting the estimated power consumption of at least one of the printing apparatus and an external device connected to the printing apparatus; determining the supply power to be transmitted to the external device by the printing apparatus based on the reception power and the estimated power consumption; and transmitting the supply power to the external device via a USB type-C connection between the printing apparatus and the external device.

According to still another embodiment, there is provided a computer program for performing a method for supplying power by using a printing apparatus supporting USB type-C, the method including: checking a reception power received from an external power source by the printing apparatus; predicting the estimated power consumption of at least one of the printing apparatus and an external device connected to the printing apparatus; determining the supply power to be transmitted to the external device by the printing apparatus based on the reception power and the estimated power consumption; and transmitting the supply power to the external device via a USB type-C connection between the printing apparatus and the external device.

According to still another embodiment, there is provided a computer-readable non-transitory storage medium having stored therein a computer program for performing a method for supplying power by using a printing apparatus supporting USB type-C, the method including: checking a reception power received from an external power source by the printing apparatus; predicting the estimated power consumption of at least one of the printing apparatus and an external device connected to the printing apparatus; determining the supply power to be transmitted to the external device by the printing apparatus based on the reception power and the estimated power consumption; and transmitting the supply power to the external device via a USB type-C connection between the printing apparatus and the external device.

A method for controlling a printing apparatus according to one embodiment is a printing apparatus control method for performing a printing operation in response to a request received from a user, the method including: detecting one or more pieces of error information related to the printing operation; and providing a message including the error information and solution information corresponding to the error information; wherein the message preferentially includes information adapted to solve an error state related to the stopping of the printing operation selected from the one or more pieces of error information.

In this case, solution information corresponding to an error state may not be provided for a preset specific error of the one or more pieces of error information. Alternatively, solution information may not be provided for the one of the one or more errors that is determined to have occurred a preset number of times or more. Alternatively, when the error state related to the stopping of the printing operation is related to paper exhaustion, the message may not include solution information corresponding to the error information.

Furthermore, when the one or more pieces of error information are all related to states related to the stopping of the printing operation, information adapted to solve the states related to the stopping of the printing operation may be sequentially provided based on preset priorities.

Furthermore, when error information related to the initial setting information of the printing apparatus is detected before the printing operation, the operation mode of the printing apparatus may be switched to a standby mode until the state of the printing apparatus corresponding to the error information is changed.

Alternatively, when one or more pieces of error information related to the stopping of the operation of the printing apparatus are detected during the printing operation, the operation mode of the printing apparatus may be switched to a standby mode until states related to the stopping of the printing operation are solved. In this case, when the one or more pieces of error information are all related to the quality of a print output by the printing apparatus, the printing operation may be continuously performed.

The information adapted to solve an error state related to the stopping of the printing operation may include at least one of text information, image information, URL information, contact information, and moving image information.

The information adapted to solve an error state related to the stopping of the printing operation may be provided in a 2D identification code form including at least one of text information, image information, URL information, contact information, and moving image information.

A method for controlling a printing apparatus according to another embodiment is a method for controlling a printing apparatus connected with one or more user terminals via wireless communication, the method including: receiving a print request for performing a printing operation; detecting one or more pieces of error information related to the printing operation; searching for solution information corresponding to the error information; and determining whether or not at least one user device is present within a preset distance from the printing apparatus; wherein a unique identification image including solution information corresponding to the error information is generated when at least one user device is present within a preset distance from the printing apparatus.

The unique identification image may preferentially include information adapted to solve a state related to the stopping of the printing operation selected from the one or more pieces of error information.

The information adapted to solve a state related to the stopping of the printing operation may include at least one of text information, image information, URL information, contact information, and moving image access information.

The unique identification image may be a 2D identification code identifiable on the user device.

One or more of the pieces of information may be selected and provided according to the identification information of the user device present within the preset distance from the printing apparatus.

MODE FOR INVENTION

Various embodiments will be described in detail below with reference to the accompanying drawings. The following embodiments may be modified to various different forms and then practiced. In order to more clearly illustrate the features of the embodiments, detailed descriptions of items that are well known to those having ordinary skill in the art to the following embodiments pertain will be omitted. In the drawings, portions unrelated to the following description will be omitted. Throughout the specification, like reference symbols will be assigned to like portions.

Throughout the specification and the claims, when one component is described as being "connected" to another component, this includes not only a case where they are "directly connected" to each other but also a case where they are "electrically connected" to each other with a third component disposed therebetween. Furthermore, when any portion is described as including any component, this does not mean that the portion does not exclude another component but means that the portion may further include another component, unless explicitly described to the contrary.

Although embodiments in which a "printing apparatus" controls the supply of power to an external device via a USB type-C connection have been described, it is obvious that a method for controlling the supply of power via a USB type-C connection, which is described therein, may be performed by not only a "printing apparatus" but also a general "electronic device." In this case, the general "electronic device" may be a device that is included in a printing system and controls a host device, a printing apparatus, and the like. For example, a tablet PC, a smartphone or the like may perform such a role. However, embodiments will be described on the assumption that the "electronic device" is a "printing apparatus."

FIG. 1 is a diagram showing the configuration of a printing apparatus that transmits part of power, received from an external power source, to a host device via a USB type-C connection according to one embodiment. Referring to FIG. 1, a printing apparatus 100 according to the one embodiment receives power from an external power source 10. Both the printing apparatus 100 and a host device 200 support USB type-C, and the printing apparatus 100 is connected to the host device 200 via USB type-C. USB type-C supports data communication up to 10 Gbps and power transmission up to 100 W. Accordingly, the printing apparatus 100 may transmit a power of up to 100 W to the host device 200 while performing data communication with the host device 200 via a USB type-C connection. A detailed method of determining the amount of power to be transmitted to the host device 200 by the printing apparatus 100 will be described in detail below.

One or more peripheral devices may be connected to the host device 200. Although a monitor 21 and a scanner 22 are shown as being connected to the host device 200 in FIG. 1, this is only one example. Various types of peripheral devices may be connected to the host device 200, and the host device 200 may transmit part of power, received from the printing apparatus 100, to the connected peripheral devices.

The detailed configuration of the printing apparatus 100 will now be described. Referring to FIG. 1, the printing apparatus 100 according to the one embodiment may include a USB type-C interface 110, a controller 120, storage 130, and a printing unit 140.

The USB type-C interface 110 is a component configured to support USB type-C, and includes a port configured such that a USB type-C terminal is connected thereto. The printing apparatus 100 may transmit and receive power and data to and from the host device 200 via the USB type-C interface 110.

The controller 120 is a component including at least one processor such as a central processing unit (CPU), and controls the overall operation of the printing apparatus 100. In particular, the controller 120 performs control to transmit part of power, received from an external power source 10, to the host device 200 via the USB type-C interface 110.

A detailed method by which the controller 120 performs control to supply power to the host device 200 will be described below.

The controller 120 checks the amount of power received from power source 10 (hereinafter referred to as "the reception power"). Furthermore, the controller 120 predicts the estimated power consumption of at least one of the printing apparatus 100 and the host device 200. In this case, the estimated power consumption refers to the amount of power that is estimated to be consumed by each device. The controller 120 may predict the estimated power consumption of each device by using various methods. For example, the controller 120 may predict estimated power consumption based on at least one of the past power usage data of each device, the operation mode of each device, and one or more tasks scheduled to be performed by each device.

First, a method of predicting estimated power consumption based on past power usage data will be described below.

Data on the amount of power that was used by the printing apparatus 100 in the past may be stored in the storage 130. Accordingly, the controller 120 may access the storage 130, may calculate the average value of the amounts of power that was used by the printing apparatus 100 during a predetermined period before the time at which estimation is performed, and may determine the calculated average value to be the estimated power consumption of the printing apparatus 100. The controller 120 may predict the estimated power consumption of the printing apparatus 100 by using the past power usage data stored in the storage 130 by means of various other methods.

The controller 120 may receive past power usage data by requesting it from the host device 200, and may predict the estimated power consumption of the host device 200 based on the received data. For example, the controller 120 may calculate the average value of the amounts of power used by the host device 200 during a predetermined period before the time at which estimation is performed, and may determine the calculated average value to be the estimated power consumption of the host device 200. The controller 120 may predict the estimated power consumption of the host device 200 by using the past power usage data received from the host device 200 by means of various other methods.

A method of predicting estimated power consumption based on the operation mode of each device will now be described.

The printing apparatus 100 and the host device 200 are each set to any one of a plurality of operation modes including a normal mode and a standby mode. In this case, a corresponding estimated power consumption may be preset for at least one of the plurality of operation modes.

The controller 120 may check the current operation mode of the printing apparatus 100, and may determine an estimated power consumption corresponding to the found operation mode to be the estimated power consumption of the printing apparatus 100.

The controller 120 may request the host device 200 to check a current operation mode, and may determine an estimated power consumption corresponding to the found operation mode to be the estimated power consumption of the host device 200 when the host device 200 responds to the request.

A method of predicting estimated power consumption based on one or more tasks scheduled to be performed by each device will now be described.

The printing apparatus 100 and the host device 200 are scheduled to perform one or more tasks.

The controller 120 may check tasks scheduled for the printing apparatus 100, may predict the amount of power required by the printing apparatus 100 in order to perform the found tasks based on the attributes of the tasks (the number of print tasks, the amount of print data corresponding to each of the tasks, whether or not color printing is performed, whether or not double-sided printing is performed, and/or the like), and may determine the estimated amount of power to be the estimated power consumption of the printing apparatus 100.

The controller 120 may request the host device 200 to check scheduled tasks, may predict the amount of power required by the host device 200 in order to perform the tasks based on the attributes of the found tasks (the number of tasks to be processed, the degree of computation required for each of the tasks, and/or the like), and may determine the estimated amount of power to be the estimated power consumption of the host device 200.

The above-described methods of predicting the estimated power consumption of each device may be applied to the following embodiments in the same manner.

The controller 120 checks the reception power, and determines the amount of power to be transmitted to the host device 200 (the supply power) based on the reception power and the estimated power consumption when the prediction of the estimated power consumption of at least one of the printing apparatus 100 and the host device 200 is completed.

For example, the controller 120 may determine a value, obtained by subtracting the estimated power consumption of the printing apparatus 100 from the reception power, to be the supply power. Alternatively, the controller 120 may determine the estimated power consumption of the host device 200 to be the supply power. However, when the estimated power consumption of the host device 200 exceeds the reception power, the reception power may be determined to be the supply power.

Meanwhile, when determining the supply power, the controller 120 may consider at least one of the minimum amount of power required by the printing apparatus 100 and the priorities of the printing apparatus 100 and the host device 200, as well as the reception power and the estimated power consumption.

The minimum amount of power of the printing apparatus 100 refers to the minimum amount of power required by the printing apparatus 100 in order to maintain a power-on state. Accordingly, a value obtained by adding the estimated power consumption of the host device 200 and the minimum amount of power of the printing apparatus 100 to each other is larger than the reception power, the controller 120 may determine a value, obtained by subtracting the minimum amount of power of the printing apparatus 100 from the reception power, to be the supply power.

The priorities of the printing apparatus 100 and the host device 200 may be preset in connection with the usage of power. When the priorities are set, the controller 120 may determine the supply power such that the estimated power consumption of one of the two devices having a higher priority is secured first.

For example, when a value obtained by adding the estimated power consumption of the printing apparatus 100 and the estimated power consumption of the host device 200 to each other is larger than the reception power, the controller 120 checks the priorities of the printing apparatus 100 and the host device 200. When the printing apparatus 100 has a higher priority, the controller 120 may determine a value, obtained by subtracting the estimated power consumption of the printing apparatus 100 from the reception power, to be the supply power. In contrast, when the host device 100 has a higher priority, the controller 120 may determine the estimated power consumption of the host device 200 to be the supply power. However, when the estimated power consumption of the host device 200 exceeds the reception power, the controller 120 may determine the reception power to be the supply power.

The controller 120 may determine the supply power by considering both the minimum amount of power of the printing apparatus 100 and the priorities of the two devices.

For example, when a value obtained by adding the estimated power consumption of the printing apparatus 100 and the estimated power consumption of the host device 200 to each other is larger than the reception power, the controller 120 checks the priorities of the printing apparatus 100 and the host device 200. When the printing apparatus 100 has a higher priority, the controller 120 may determine a value, obtained by subtracting the estimated power consumption of the printing apparatus 100 from the reception power, to be the supply power. In contrast, when the host device 100 has a higher priority, the controller 120 may determine the smaller value of a value, obtained by subtracting the minimum amount of power of the printing apparatus 100 from the reception power, and the estimated power consumption of the host device 200 to be the supply power.

When the supply power is determined, the controller 120 performs control to transmit the determined supply power to the host device 200 via the USB type-C interface 110.

Meanwhile, although the host device 200 is shown as being connected to the printing apparatus 100 via USB type-C in FIG. 1, this is only one example. The printing apparatus 100 may be connected to various devices via USB type-C, and may supply power to the connected devices.

A method by which the printing apparatus supplies power to the host device via a USB type-C connection will be described with reference to FIGS. 2 to 11 below. The method of supplying power via USB type-C according to the embodiments shown in FIGS. 2 to 11 includes steps that are performed in a time-series manner in the printing apparatus 100 shown in FIG. 1. Accordingly, the descriptions that are omitted below but are given above in conjunction with the printing apparatus 100 shown in FIG. 1 may be also applied to the method of supplying power via USB type-C according to the embodiments shown in FIGS. 2 to 11.

Figure 2:
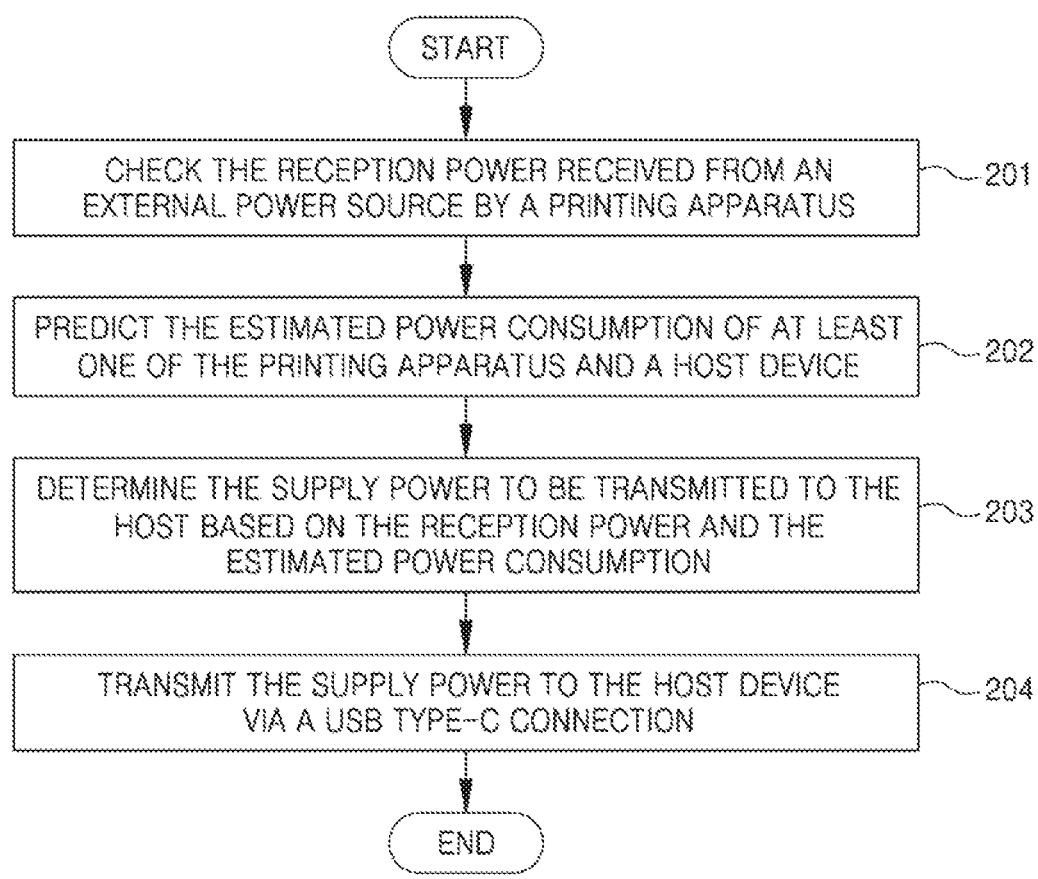
FIG. 2 is a flowchart illustrating a power supply method of a printing apparatus supporting USB type-C according to one embodiment.

FIG. 2 is a flowchart illustrating a power supply method of a printing apparatus supporting USB type-C according to one embodiment. Referring to FIG. 2, at step 201, the printing apparatus checks the reception power received from an external power source. At step 202, the printing apparatus predicts the estimated power consumption of at least one of the printing apparatus and the host device. The host device is connected to the printing apparatus via USB type-C, and receives power from the printing apparatus via a USB type-C connection. It will be apparent that various types of devices other than the host device may be connected to the printing apparatus and may receive power from the printing apparatus via a USB type-C connection.

At step 203, the printing apparatus may determine the supply power to be transmitted to the host device based on the reception power and the estimated power consumption. A detailed method by which the printing apparatus determines the supply power is the same as described with reference to FIG. 1 above.

At step 204, the printing apparatus may transmit the supply power and determined at step 203 to the host device via a USB type-C connection.

Figure 3:
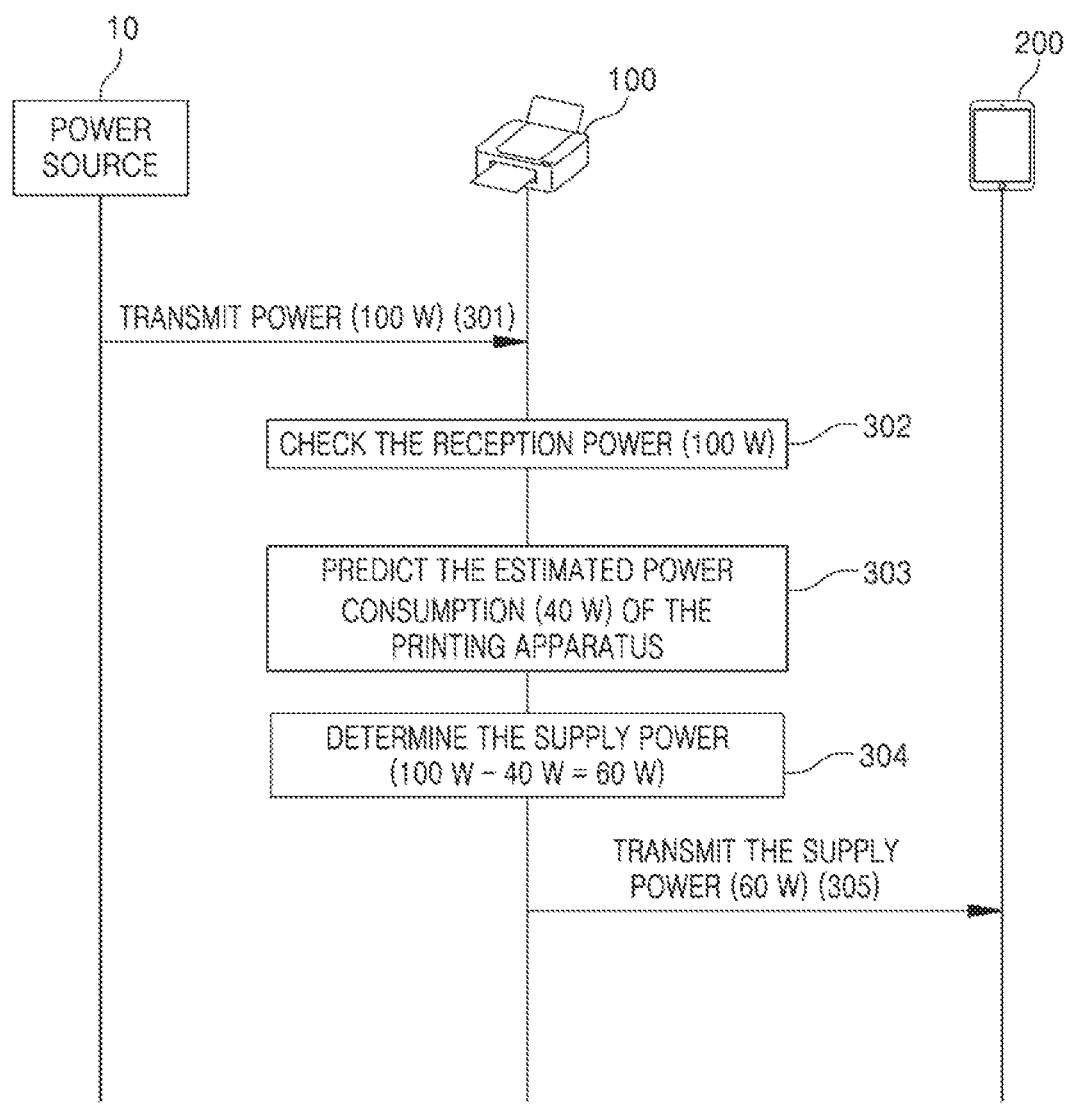
FIGS. 3 and 4 are diagrams illustrating a process in which the printing apparatus supplies power to the host device via a USB type-C connection according to the embodiment shown in FIG. 2.
Figure 4:
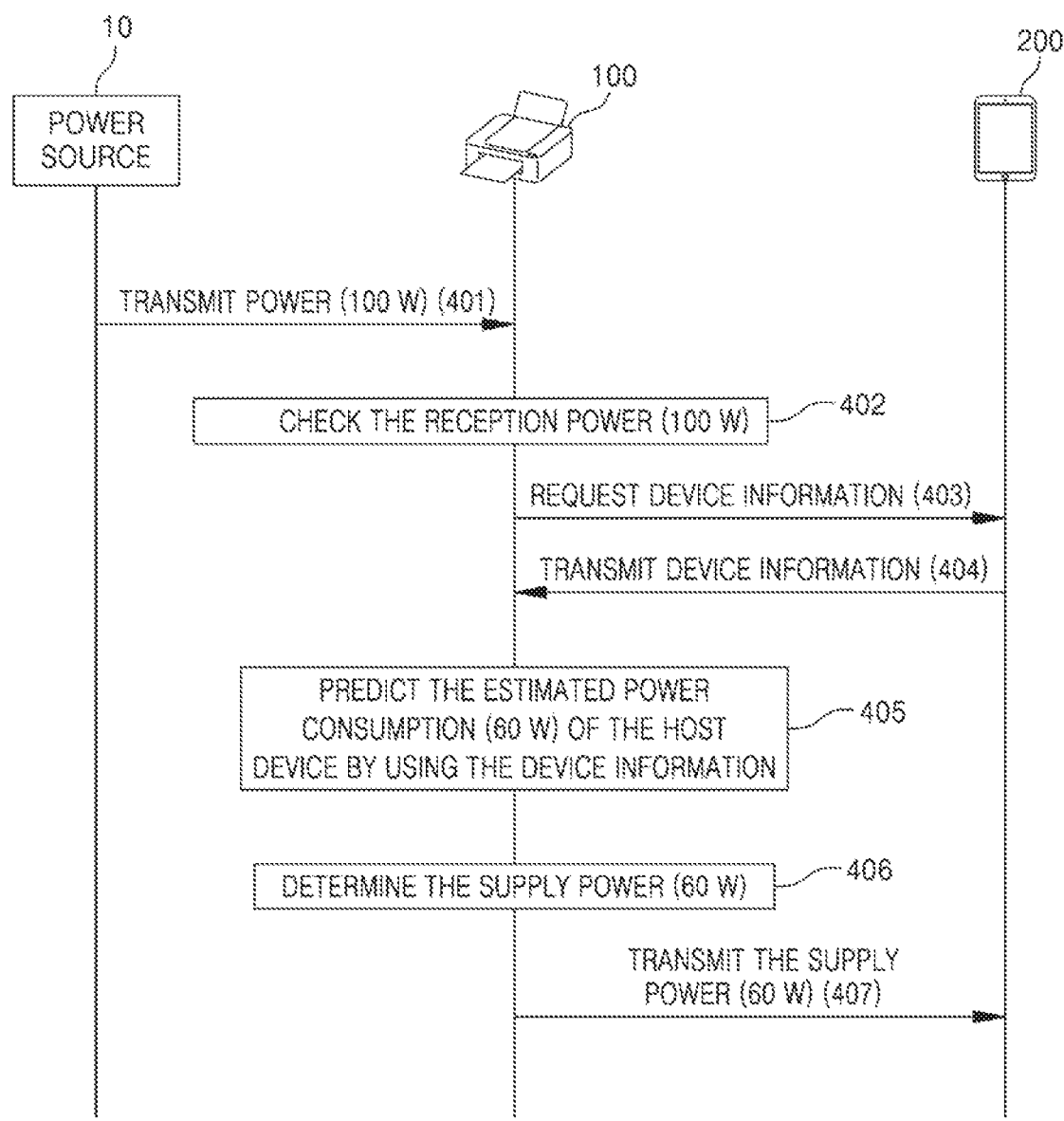

FIGS. 3 and 4 are diagrams illustrating a process in which the printing apparatus supplies power to the host device via a USB type-C connection according to the embodiment shown in FIG. 2. In the embodiment shown in FIG. 3, the supply power is determined by comparing the reception power and the estimated power consumption of the printing apparatus 100 with each other. In the embodiment shown in FIG. 4, the supply power is determined by comparing the reception power and the estimated power consumption of the host device 200 with each other. In the embodiments shown in FIGS. 3 and 4, a processing process based on the actual amounts of power is made easy to understand by describing examples of the specific amounts of power.

Referring to FIG. 3, the printing apparatus 100 receives a power of 100 W from the power source 10 at step 301, and checks that the reception power is 100 W at step 302.

At step 303, the printing apparatus 100 predicts the estimated power consumption of the printing apparatus 100 to be 40 W. The printing apparatus 100 may predict the estimated power consumption of the printing apparatus 100 based on at least one of the past power usage data of the printing apparatus 100, the operation mode of the printing apparatus 100, and one or more tasks scheduled to be performed by the printing apparatus 100. A detailed method of predicting the estimated power consumption of the printing apparatus 100 is the same as described with reference to FIG. 1 above.

At step 304, the printing apparatus 100 determines 60 W, i.e., a value obtained by subtracting the estimated power consumption of the printing apparatus 100, i.e., 40 W, from the reception power, i.e., 100 W, to be the supply power.

At step 305, the printing apparatus 100 transmits the determined supply power, i.e., 60 W, to the host device 200 via a USB type-C connection.

Referring to FIG. 4, the printing apparatus 100 receives a power of 100 W from the power source 10 at step 401, and checks that the reception power is 100 W at step 402.

When the printing apparatus 100 requests device information, required to predict the estimated power consumption of the host device 200, from the host device 200 at step 403, the host device 200 transmits the device information to the printing apparatus 100 at step 404. In this case, the device information of the host device 200 may include at least one of the past power usage data of the host device 200, the operation mode of the host device 200, and information about one or more tasks scheduled to be performed in the host device 200.

At step 405, the printing apparatus 100 predicts the estimated power consumption of the host device 200 to be 60 W by using the device information received from the host device 200. A detailed method of predicting the estimated power consumption of the host device 200 is the same as described with reference to FIG. 1 above.

At step 406, the printing apparatus 100 determines 60 W, i.e., the estimated power consumption of the host device 200, to be the supply power.

At step 407, the printing apparatus 100 transmits the determined supply power, i.e., 60 W, to the host device 200 via a USB type-C connection.

Figure 5:
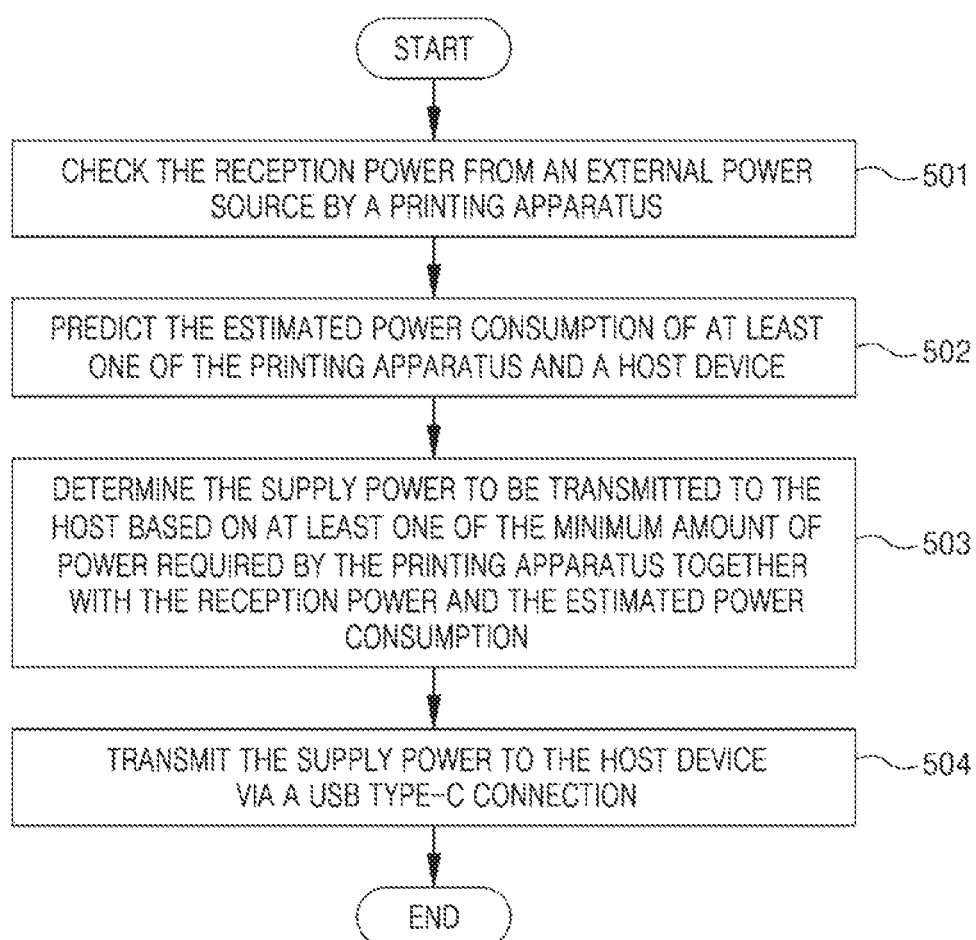
FIG. 5 is a flowchart illustrating a power supply method of a printing apparatus supporting USB type-C according to one embodiment.

FIG. 5 is a flowchart illustrating a power supply method of a printing apparatus supporting USB type-C according to one embodiment. Compared with the embodiment shown in FIG. 2, this embodiment considers at least one of the minimum amount of power of the printing apparatus and the priorities of the printing apparatus and the host device as well as the reception power and the estimated power consumption when determining the supply power. As described above, the minimum amount of power printing apparatus refers to the minimum amount of power required by the printing apparatus to maintain a power-on state, and priorities may be preset for the printing apparatus and the host device in connection with the usage of power.

Referring to FIG. 5, the printing apparatus checks the reception power received from an external power source at step 501. At step 502, the printing apparatus predicts the estimated power consumption of at least one of the printing apparatus and the host device. The host device is connected to the printing apparatus via USB type-C, and receives power from the printing apparatus via a USB type-C connection. It will be apparent that various types of devices other than the host device may be connected to the printing apparatus and may receive power from the printing apparatus via a USB type-C connection.

At step 503, the printing apparatus determines the supply power to be transmitted to the host device by considering at least one of the minimum amount of power of the printing apparatus and the priorities of the printing apparatus and the host device as well as the reception power and the estimated power consumption. A detailed method by which the printing apparatus determines the supply power is the same as described with reference to FIG. 1 above, and will be described again with reference to FIGS. 6, 8 and 10 below.

Figure 6:
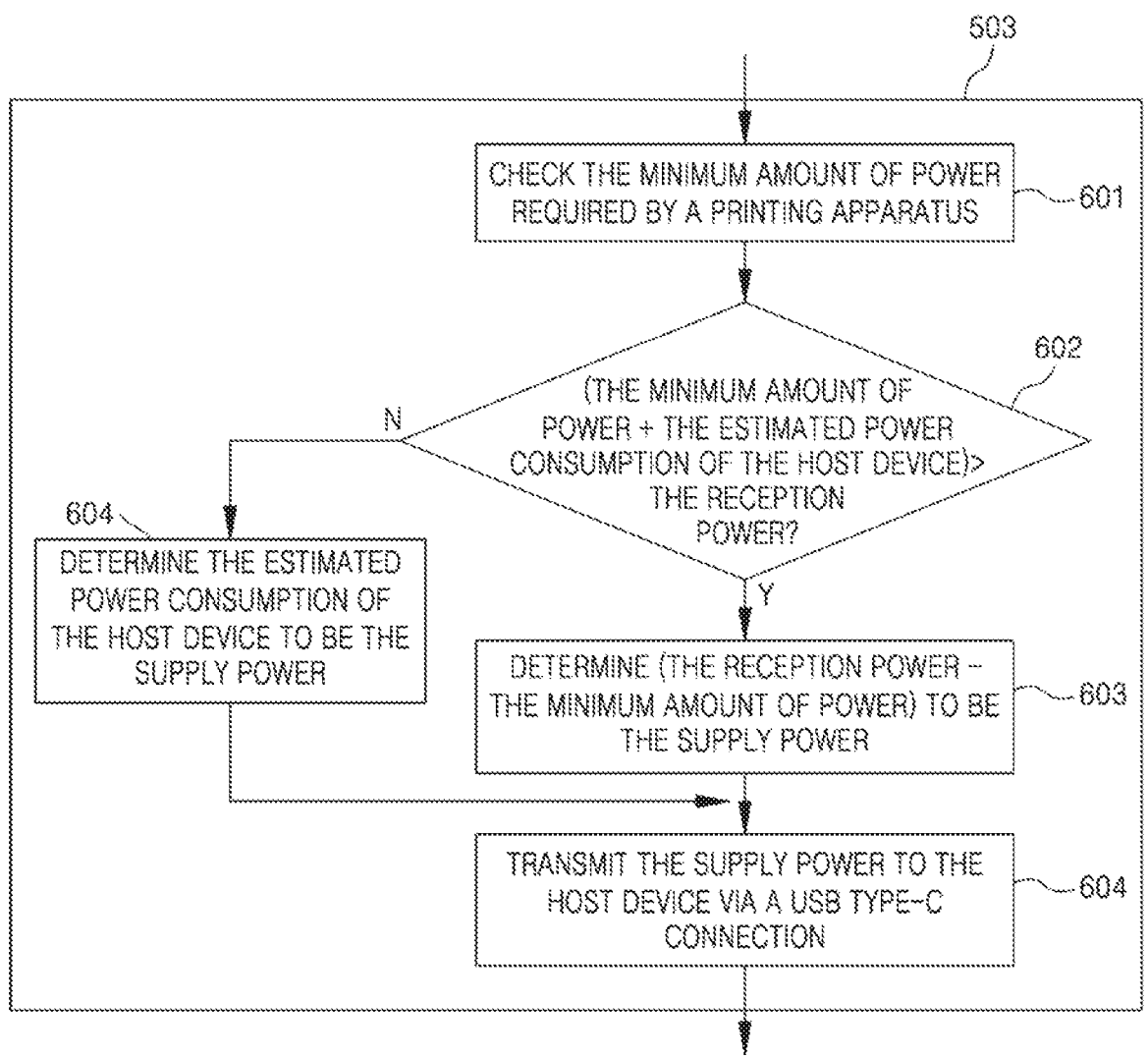
FIG. 6 is a flowchart showing detailed steps included in step 503 of FIG. 5 according to one embodiment.

FIG. 6 is a flowchart showing detailed steps included in step 503 (the step of determining the supply power) of FIG. 5 according to one embodiment. Referring to FIG. 6, the printing apparatus checks the minimum amount of power required by the printing apparatus at step 601. At step 602, the printing apparatus compares a value, obtained by adding the minimum amount of power and the estimated power consumption of the host device predicted at step 502, with the reception power and found at step 501.

When, as a result of the comparison, a value obtained by adding the minimum amount of power of the printing apparatus and the estimated power consumption of the host device to each other is larger than the reception power, the process proceeds to step 603, at which the printing apparatus determines a value, obtained by subtracting the minimum amount of power from the reception power, to be the supply power.

In contrast, when a value obtained by adding the minimum amount of power of the printing apparatus and the estimated power consumption of the host device to each other is equal to or lower than the reception power, the process proceeds to step 605, at which the printing apparatus determines the estimated power consumption of the host device to be the supply power.

At step 604, the printing apparatus transmits the determined supply power to the host device via a USB type-C connection.

Figure 7:
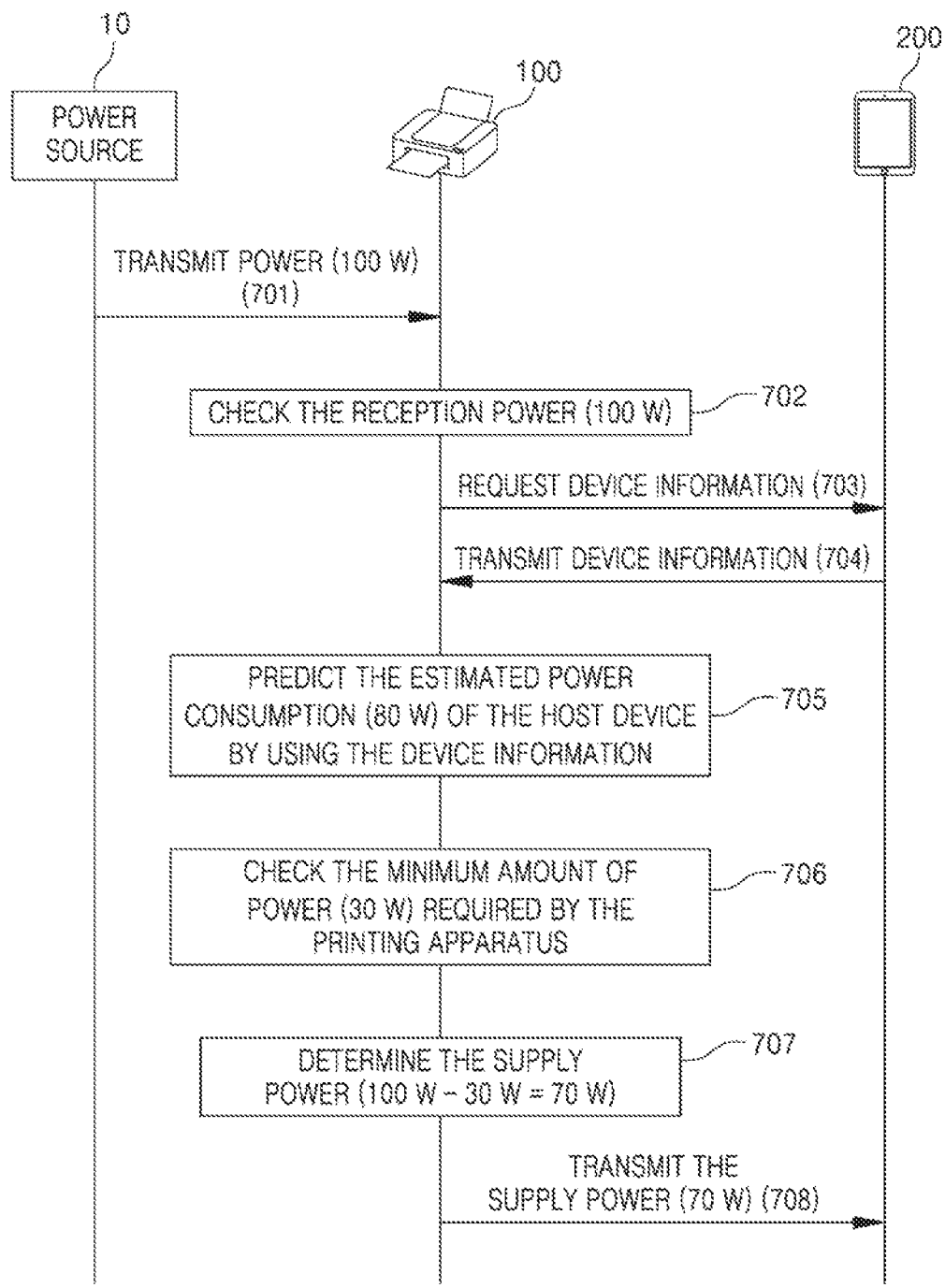
FIG. 7 is a diagram illustrating a process in which the printing apparatus supplies power to the host device via a USB type-C connection according to the embodiment shown in FIGS. 5 and 6.

FIG. 7 is a diagram illustrating a process in which the printing apparatus supplies power to the host device via a USB type-C connection according to the embodiment shown in FIGS. 5 and 6. In the embodiment shown in FIG. 7, a processing process based on the actual amounts of power is made easy to understand by describing examples of the specific amounts of power.

Referring to FIG. 7, the printing apparatus 100 receives a power of 100 W from the power source 10 at step 701, and checks that the reception power is 100 W at step 702.

When the printing apparatus 100 requests device information, required to predict the estimated power consumption of the host device 200, from the host device 200 at step 703, the host device 200 transmits the device information to the printing apparatus 100 at step 704. In this case, the device information of the host device 200 may include at least one of the past power usage data of the host device 200, the operation mode of the host device 200, and information about one or more tasks scheduled to be performed in the host device 200.

At step 705, the printing apparatus 100 predicts the estimated power consumption of the host device 200 to be 80 W by using the device information received from the host device 200. A detailed method of predicting the estimated power consumption of the host device 200 is the same as described with reference to FIG. 1 above.

At step 706, the printing apparatus 100 checks that the minimum amount of power of the printing apparatus is 30 W.

At step 707, the printing apparatus 100 determines the supply power. Referring additionally to FIG. 6, a value, i.e., 110 W, obtained by adding the minimum amount of power, i.e., 30 W, and the estimated power consumption of the host device, i.e., 80 W, to each other is larger than the reception power, i.e., 100 W. Accordingly, when the printing apparatus 100 transmits the estimated power consumption of the host device 200, i.e., 80 W, to the host device 200, it may be impossible to secure the minimum amount of power, i.e., 30 W. Accordingly, the printing apparatus 100 determines 70 W, i.e., a value obtained by subtracting the minimum amount of power, i.e., 30 W, from the reception power, i.e., 100 W, to be the supply power.

At step 708, the printing apparatus 100 transmits the determined supply power, i.e., 70 W, to the host device 200 via a USB type-C connection.

Figure 8:
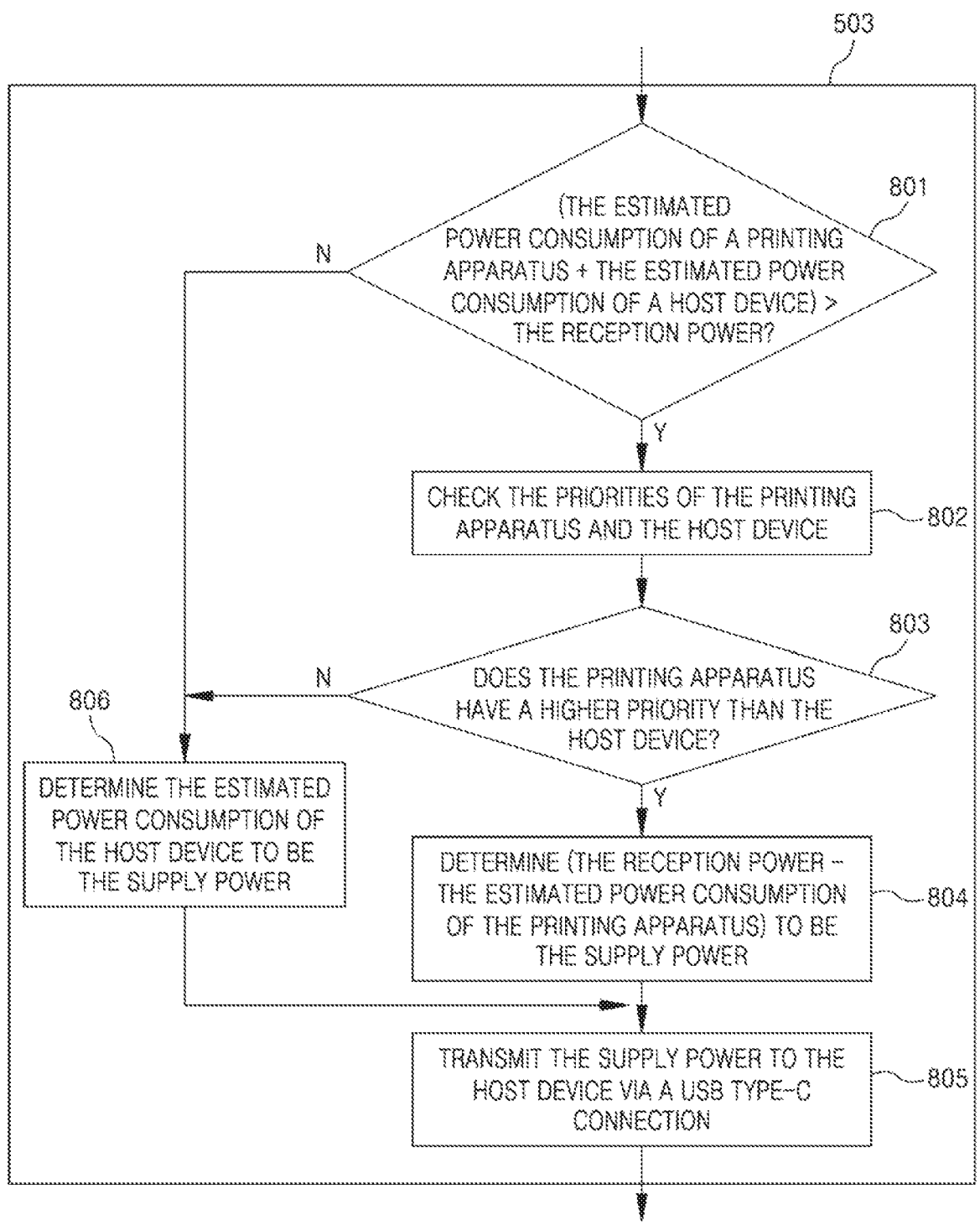
FIG. 8 is a flowchart showing detailed steps included in step 503 of FIG. 5 according to one embodiment.

FIG. 8 is a flowchart showing detailed steps included in step 503 of FIG. 5 according to one embodiment. Referring to FIG. 8, at step 801, the printing apparatus compares a value, obtained by adding the estimated power consumption of the printing apparatus predicted at step 502 and the estimated power consumption of the host device to each other, with the reception power and found at step 501.

When, as a result of the comparison, a value obtained by adding the estimated power consumption of the printing apparatus and the estimated power consumption of the host device to each other is larger than the reception power, the process proceeds to step 802, at which the process checks the priorities of the printing apparatus and the host device.

In contrast, when the value obtained by adding the estimated power consumption of the printing apparatus and the estimated power consumption of the host device to each other is equal to or smaller than the reception power, the process proceeds to step 806, at which the process determines the estimated power consumption of the host device to be the supply power.

The priorities of the printing apparatus and the host device are checked at step 802, and the printing apparatus determines whether or not the printing apparatus has a higher priority than the host device at step 803.

When, as a result of the determination, the printing apparatus has a higher priority than the host device, the process proceeds to step 804, at which the printing apparatus determines a value, obtained by subtracting the estimated power consumption of the printing apparatus from the reception power, to be the supply power.

In contrast, when the printing apparatus has a lower priority than the host device, the process proceeds to step 806, at which the printing apparatus determines the estimated power consumption of the host device to be the supply power.

At step 805, the printing apparatus transmits the determined supply power to the host device via a USB type-C connection.

Figure 9:
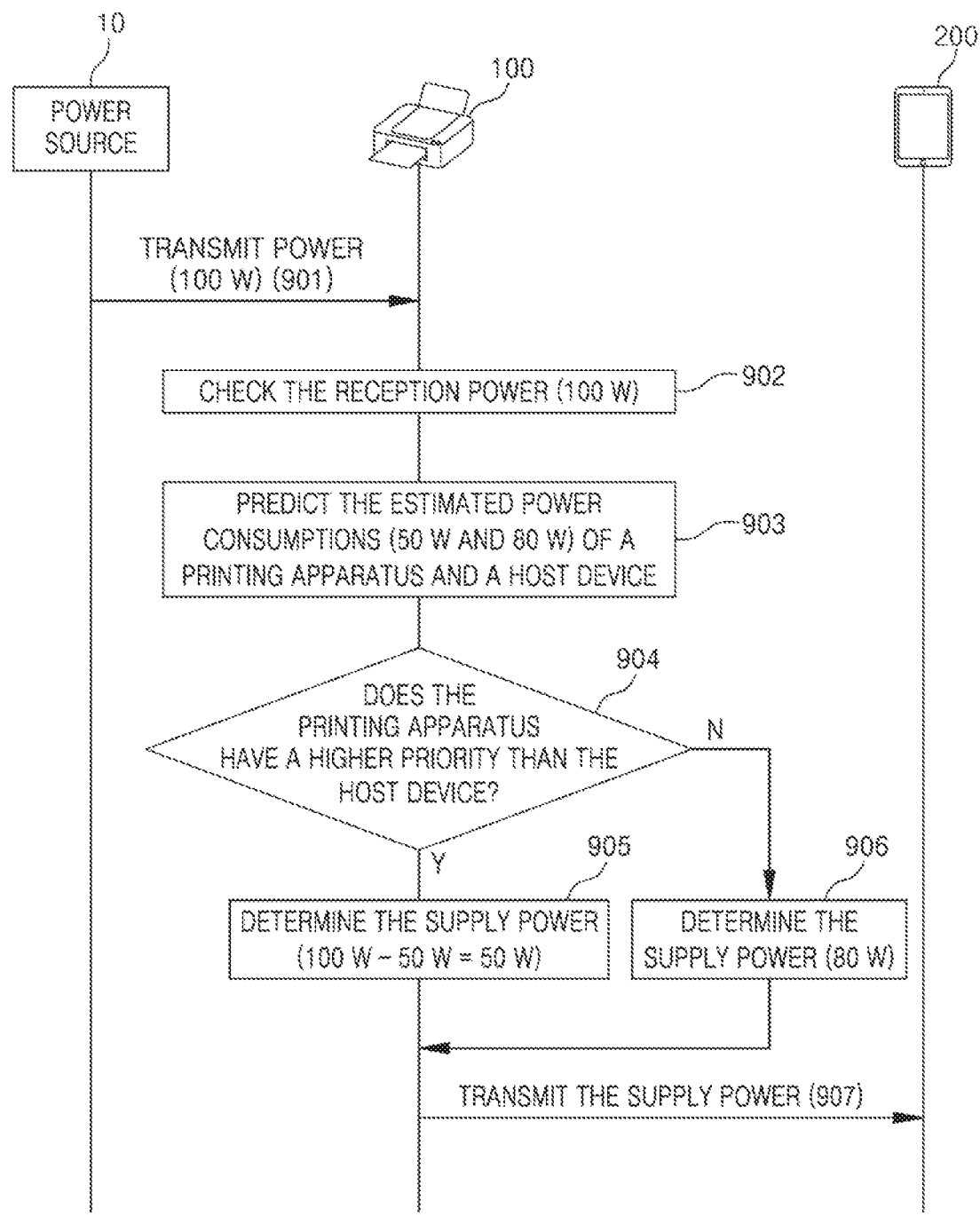
FIG. 9 is a diagram illustrating a process in which the printing apparatus supplies power to the host device via a USB type-C connection according to the embodiment shown in FIGS. 5 and 8.

FIG. 9 is a diagram illustrating a process in which the printing apparatus supplies power to the host device via a USB type-C connection according to the embodiment shown in FIGS. 5 and 8. In the embodiment shown in FIG. 9, a processing process based on the actual amounts of power is made easy to understand by describing examples of the specific amounts of power.

Referring to FIG. 9, the printing apparatus 100 receives a power of 100 W from the power source 10 at step 901, and checks that the reception power is 100 W at step 902.

At step 903, the printing apparatus 100 predicts the estimated power consumption of the printing apparatus 100 to be 50 W, and predicts the estimated power consumption of the host device 200 to be 80 W. A detailed method of predicting the estimated power consumptions of the printing apparatus 100 and the host device 200 is the same as described with reference to FIG. 1 above.

At step 904, the printing apparatus 100 determines whether or not the printing apparatus 100 has a higher priority than the host device 200.

When, as a result of the determination, the printing apparatus 100 has a higher priority than the host device 200, the estimated power consumption of the printing apparatus 100 is secured in preference to the estimated power consumption of the host device 200. Accordingly, the process proceeds to step 905, at which the printing apparatus 100 determines 50 W, i.e., a value obtained by subtracting the estimated power consumption of the printing apparatus 100, i.e., 50 W, from the reception power, i.e., 100 W, to be the supply power.

In contrast, when the printing apparatus 100 has a lower priority than the host device 200, the estimated power consumption of the host device 200 is secured in preference to the estimated power consumption of the printing apparatus 100. Accordingly, the process proceeds to step 906, at which the printing apparatus 100 determines 80 W, i.e., the estimated power consumption of the host device 200, to be the supply power.

At step 907, the printing apparatus 100 transmits the determined supply power to the host device 200 via a USB type-C connection.

Figure 10:
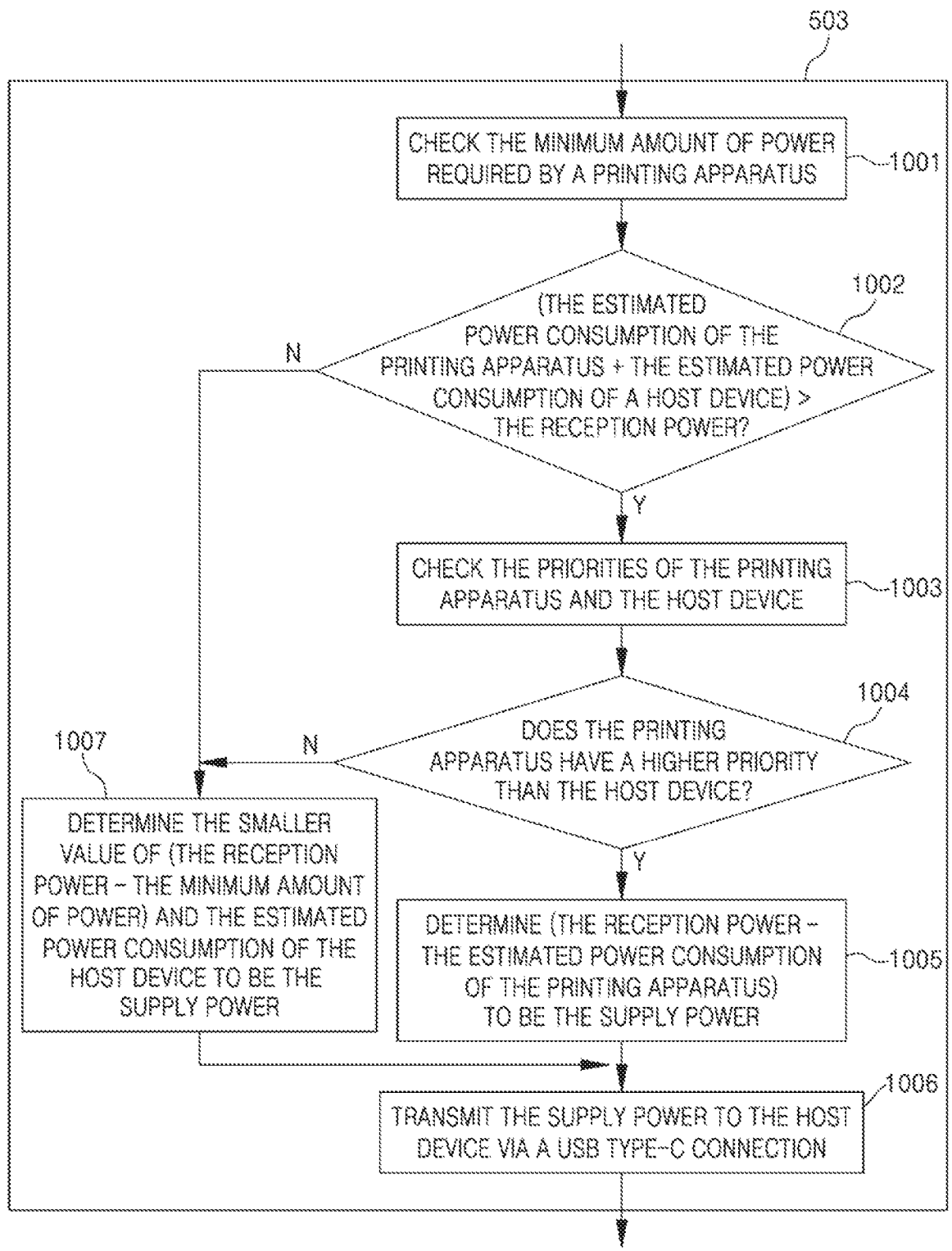
FIG. 10 is a flowchart showing detailed steps included in step 503 of FIG. 5 according to one embodiment.

FIG. 10 is a flowchart showing detailed steps included in step 503 of FIG. 5 according to one embodiment. Referring to FIG. 10, at step 1001, the printing apparatus checks the minimum amount of power required by the printing apparatus.

At step 1002, the printing apparatus compares a value, obtained by adding the estimated power consumption of the printing apparatus predicted at step 502 and the estimated power consumption of the host device, with the reception power found at step 501.

When, as a result of the comparison, a value obtained by adding the estimated power consumption of the printing apparatus and the estimated power consumption of the host device to each other is larger than the reception power, the process proceeds to step 1003, at which the priorities of the printing apparatus and the host device are checked.

In contrast, when the value obtained by adding the estimated power consumption of the printing apparatus and the estimated power consumption of the host device to each other is equal to or smaller than the reception power, the process proceeds to step 1007, at which the smaller value of a value, obtained by subtracting the minimum amount of power from the reception power, and the estimated power consumption of the host device is determined to be the supply power.

The priorities of the printing apparatus and the host device are checked at step 1003, and the printing apparatus determines whether or not the printing apparatus has a higher priority than the host device at step 1004.

When, as a result of the determination, the printing apparatus has a higher priority than the host device, the process proceeds to step 1005, at which the printing apparatus determines a value, obtained by subtracting the estimated power consumption of the printing apparatus from the reception power, to be the supply power.

In contrast, when a printing apparatus has a lower priority than the host device, the process proceeds to step 1007, at which the smaller value of a value, obtained by subtracting the minimum amount of power from the reception power, and the estimated power consumption of the host device is determined to be the supply power.

At step 1006, the printing apparatus transmits the determined supply power to the host device via a USB type-C connection.

Figure 11:
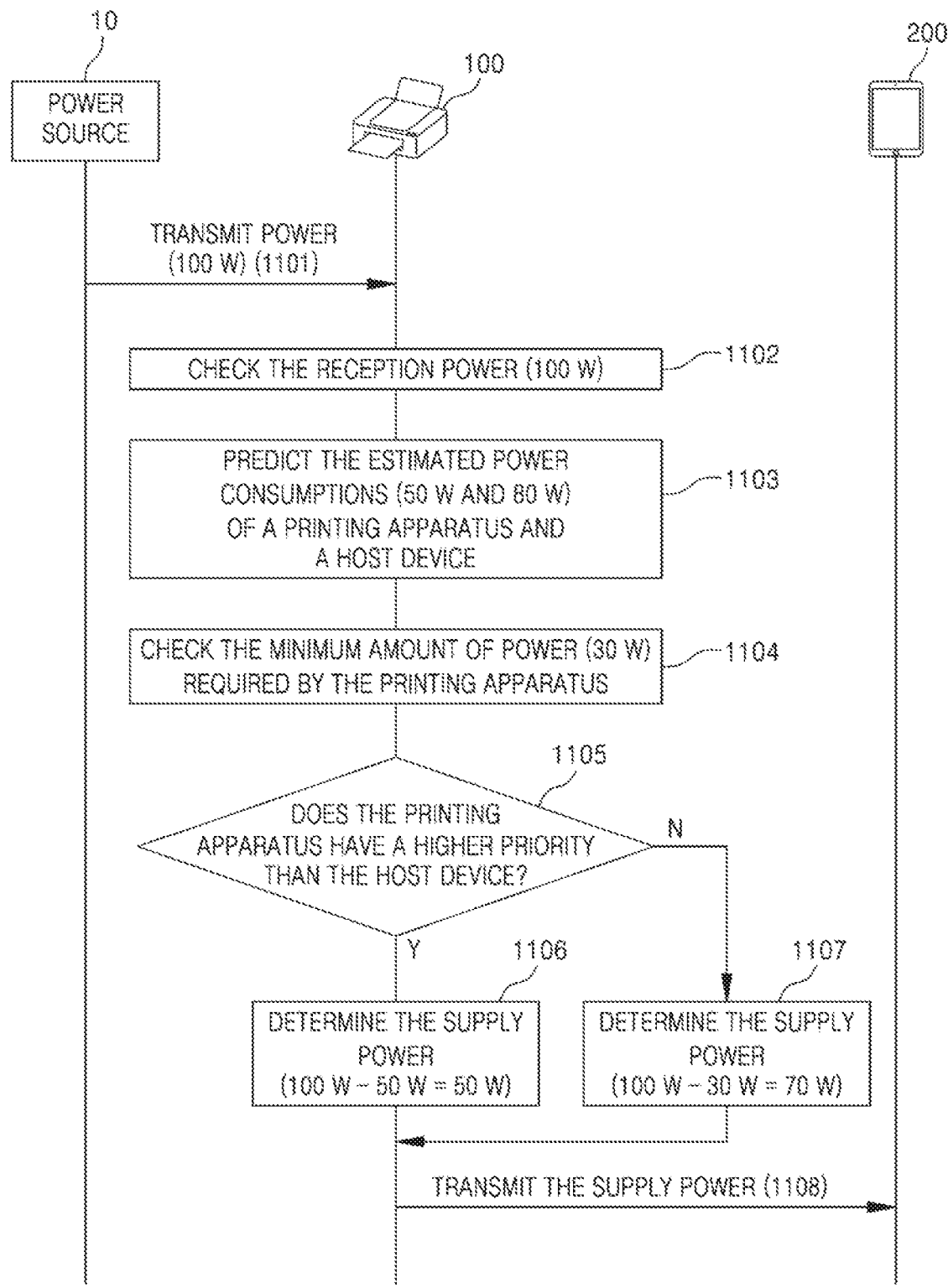
FIG. 11 is a diagram illustrating a process in which the printing apparatus supplies power to the host device via a USB type-C connection according to the embodiment shown in FIGS. 5 and 10.

FIG. 11 is a diagram illustrating a process in which the printing apparatus supplies power to the host device via a USB type-C connection according to the embodiment shown in FIGS. 5 and 10. In the embodiment shown in FIG. 11, a processing process based on the actual amounts of power is made easy to understand by describing examples of the specific amounts of power.

Referring to FIG. 11, the printing apparatus 100 receives a power of 100 W from the power source 10 at step 1101, and checks that the reception power is 100 W at step 1102.

At step 1103, the printing apparatus 100 predicts the estimated power consumption of the printing apparatus 100 to be 50 W, and predicts the estimated power consumption of the host device 200 to be 80 W. A detailed method of predicting the estimated power consumptions of the printing apparatus 100 and the host device 200 is the same as described with reference to FIG. 1 above.

At step 1104, the printing apparatus 100 checks that the minimum amount of power of the printing apparatus 100 is 30 W.

At step 1105, the printing apparatus 100 determines whether or not the printing apparatus 100 has a higher priority than the host device 200.

When, as a result of the determination, the printing apparatus 100 has a higher priority than the host device 200, the estimated power consumption of the printing apparatus 100 is secured in preference to the estimated power consumption of the host device 200. Accordingly, the process proceeds to step 1106, at which the printing apparatus 100 determines 50 W, i.e., a value obtained by subtracting the estimated power consumption of the printing apparatus 100, i.e., 50 W, from the reception power, i.e., 100 W, to be the supply power.

In contrast, when the printing apparatus 100 has a lower priority than the host device 200, the estimated power consumption of the host device 200 is secured in preference to the estimated power consumption of the printing apparatus 100. Accordingly, the process proceeds to step 1107, at which the printing apparatus 100 determines the supply power. At step 1107, the printing apparatus 100 compares 70 W, i.e., a value obtained by subtracting the minimum amount of power, i.e., 30 W, from the reception power, i.e., 100 W, with 80 W, i.e., the estimated power consumption of the host device 200, and determines 70 W, i.e., the smaller value of the two values, to be the supply power.

At step 1108, the printing apparatus 100 transmits the determined supply power to the host device 200 via a USB type-C connection.

Although the case where the printing apparatus 100 is connected to a single device (the host device 200), as shown in FIG. 1, has been described so far, the USB type-C interface 110 may have multiple ports, and thus the printing apparatus 100 may be connected to a plurality of external devices. An embodiment of a case where a plurality of external devices is connected to the printing apparatus 100 will be described below.

In the case where the printing apparatus 100 is connected to a plurality of external devices via the USB type-C interface 110, the controller 120 may determine the supply power to be transmitted to each of the external devices.

The reception power received by the printing apparatus 100 from the power source 10 may not be sufficient to supply power to all the plurality of external devices. Even in this case, priorities may be set for the external devices in order to control the supply of the amount of power.

The priorities of the plurality of external devices may be set using various methods. For example, a user may allocate priorities to the plurality of external devices, respectively, while connecting the external devices to the printing apparatus 100. Alternatively, the priorities of the external devices may be determined according to the sequence in which the external devices are connected to the printing apparatus 100. Alternatively, the priorities of the external devices may be determined according to the characteristics of the external devices, in which case the printing apparatus 100 may determine the characteristics of the connected external devices and may allocate priorities to the external devices according to the determined characteristics.

A detailed method by which the printing apparatus 100 determines the supply power to be transmitted to a plurality of external devices will be described with reference to FIGS. 12 to 14 below.

Figure 12:
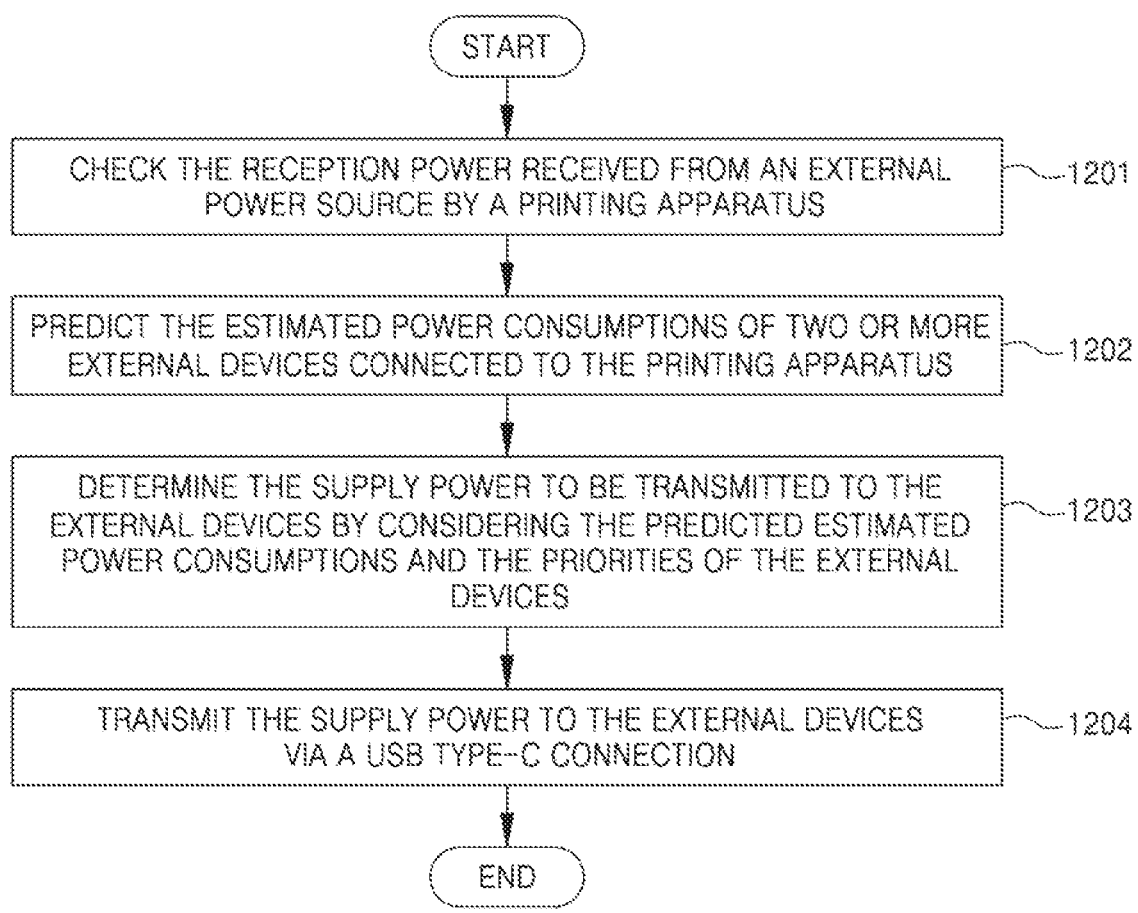
FIG. 12 is a flowchart illustrating a method of controlling the supply of power in the case where a plurality of external devices is connected to the printing apparatus according to one embodiment.
Figure 13:
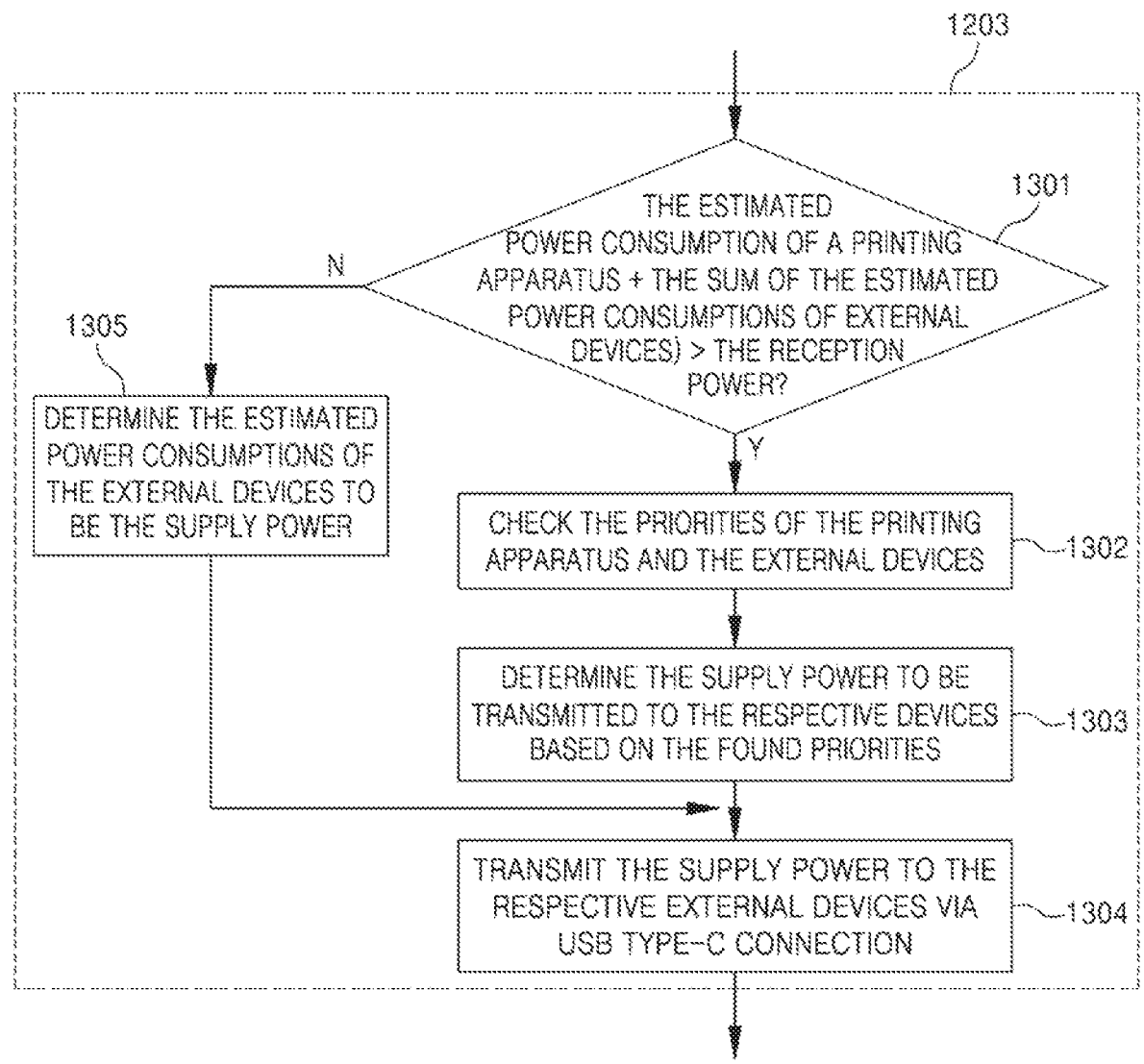
FIGS. 13 and 14 are flowcharts showing detailed steps included in step 1203 of FIG. 12.
Figure 14:
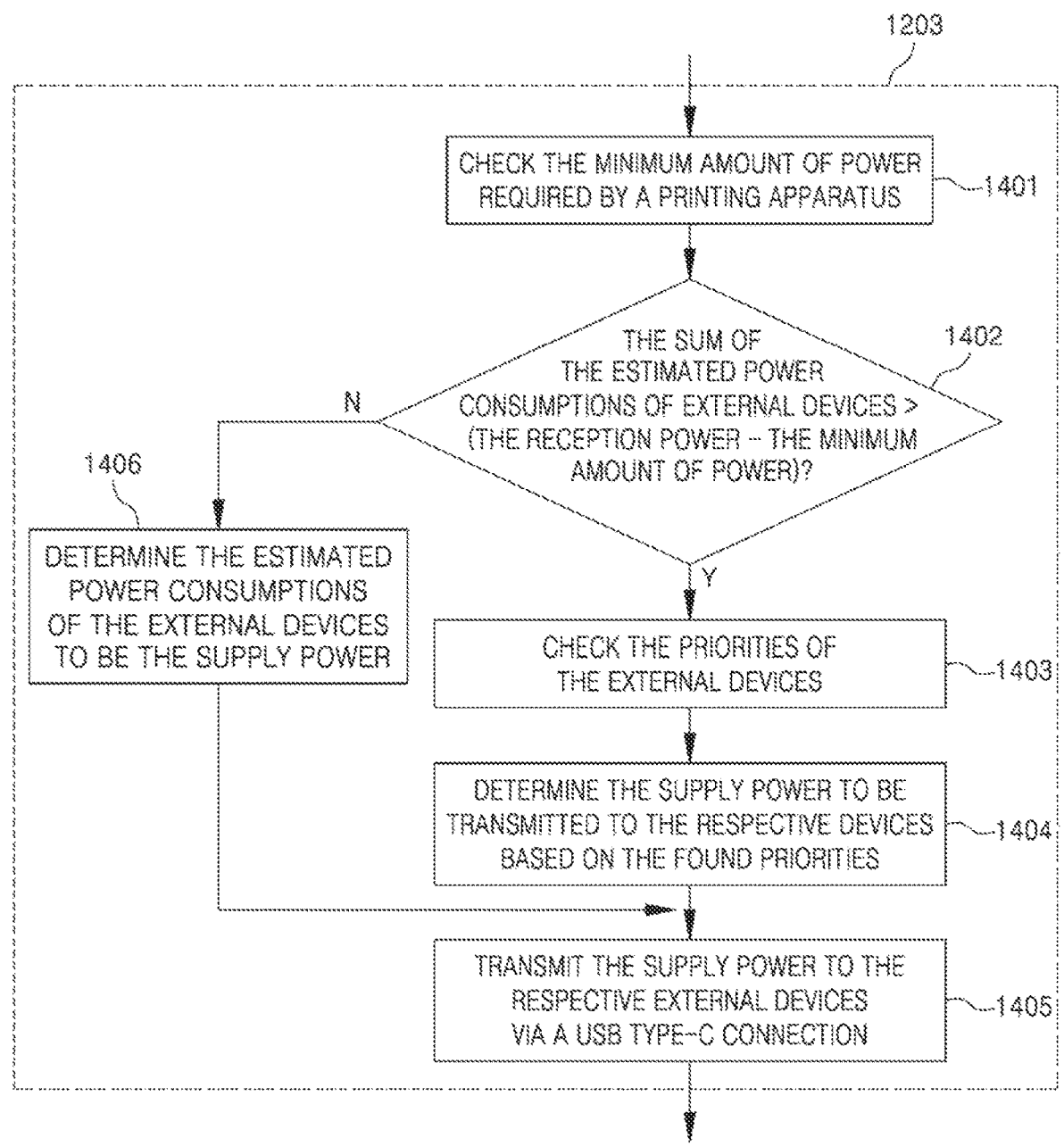

FIG. 12 is a flowchart illustrating a method of controlling the supply of power in the case where a plurality of external devices is connected to the printing apparatus according to one embodiment, and FIGS. 13 and 14 are flowcharts showing detailed steps included in step 1203 of FIG. 12.

Referring to FIG. 12, the printing apparatus 100 checks the reception power received from the external power source 10 at step 1201, and predicts the estimated power consumption of each of two or more external devices connected to the printing apparatus 100 via the USB type-C interface 110 at step 1202. A method of predicting the estimated power consumptions of the external devices is the same as the above-described method of predicting the estimated power consumption of the host device 200.

At step 1203, the printing apparatus 100 may determine the supply power to be transmitted to each of the external devices by considering the estimated power consumption predicted at step 1202 and the priorities of the external devices. Detailed steps included in step 1203 will be described with reference to FIGS. 13 and 14.

At step 1204, the printing apparatus 100 may transmit the amounts of power to be supplied and determined at step 1203 to the external devices via the connection of the USB type-C interface 110.

FIG. 13 shows an embodiment in which the amounts of power to be supplied and to be transmitted to the external devices are determined based on the priorities of the printing apparatus 100 and the external devices.

Referring to FIG. 13, at step 1301, the printing apparatus 100 determines whether or not a value obtained by summing the estimated power consumption of the printing apparatus 100 and the estimated power consumptions of the external devices is larger than the reception power by the printing apparatus 100 from the power source 10.

When it is determined that the sum of the estimated power consumptions is smaller than the reception power, the process proceeds to step 1305, at which the printing apparatus 100 determines the estimated power consumption of each of the external devices to be the supply power to be transmitted to each of the external devices.

In contrast, when it is determined that the sum of the estimated power consumptions is larger than the reception power, the process proceeds to step 1302, at which the printing apparatus 100 checks the priorities of the printing apparatus 100 and the external devices, and then the process proceeds to step 1303, at which the printing apparatus 100 determines the amounts of power to be supplied and to be transmitted to the respective devices based on the priorities. For example, the printing apparatus 100 may secure the estimated power consumption of a device having a higher priority first, and may then allocate the remaining amount of power to one or more devices having lower priorities.

At step 1304, the printing apparatus 100 may transmit the supply power and determined at step 1303 to each of the external devices via the USB type-C interface 110.

FIG. 14 shows an embodiment in which the minimum amount of power of the printing apparatus 100 is secured first and then the amounts of power to be supplied to respective external devices are determined based on the priorities of the external devices.

Referring to FIG. 14, at step 1401, the printing apparatus 100 checks the minimum amount of power required by itself. At step 1402, the printing apparatus 100 determines whether or not a value obtained by adding the estimated power consumptions of external devices to each other is larger than a value obtained by subtracting the minimum amount of power from the reception power.

When the result of the determination at step 1402 is "No," the process proceeds to step 1406, at which the printing apparatus 100 determines the estimated power consumption of each of the external devices to be the supply power to be transmitted to the external device.

In contrast, when the result of the determination at step 1402 is "Yes," the process proceeds to step 1403, at which the printing apparatus 100 checks the priorities of the external devices, and then the process proceeds to step 1404, at which the printing apparatus 100 determines the amounts of power to be supplied to the respective external devices based on the found priorities. For example, the printing apparatus 100 may first secure the minimum amount of power of the printing apparatus 100 in the reception power, the estimated power consumption of an external device having a higher priority may be secured in the remaining amount of power, and the finally remaining amount of power may be allocated to one or more devices having lower priorities.

At step 1405, the printing apparatus 100 may transmit the amounts of power to be supplied and determined at step 1404 to the respective external devices via the USB type-C interface 110.

As described in conjunction with the embodiments above, when a print event occurs in the state in which the printing apparatus has entered a deep sleep mode, a host device, a wireless module or a network relay device transmits a wake-up signal to the printing apparatus first, and then transmits print data to the printing apparatus after the elapse of predetermined time, thereby allowing the printing apparatus to receive the print data after being switched to a normal mode. Accordingly, an advantage arises in that print data is not lost during a process in which the printing apparatus is switched to a normal mode.

As described in conjunction with the embodiments above, the printing apparatus determines the supply power to be transmitted to an external device (a host device) based on the results of the prediction of the estimated power consumptions of the printing apparatus and the external device connected to the connected printing apparatus, thereby providing the advantage of efficiently distributing power, received from the power source, according to the situation.

Furthermore, the printing apparatus determines the supply power by considering both the minimum amount of power of the printing apparatus and the priorities of the printing apparatus and an external device, thereby allowing for the effect of increasing the appropriateness and flexibility of power distribution to be expected.

The term 'unit' used in the above-described embodiments means software or a hardware component such as a field-programmable gate array (FPGA) or application-specific integrated circuit (ASIC), and a 'unit' performs a specific role. However, a 'unit' is not limited to software or hardware. A 'unit' may be configured to be present in an addressable storage medium, and also may be configured to run one or more processors. Accordingly, as an example, a 'unit' includes components such as software components, object-oriented software components, class components and task components, processes, functions, attributes, procedures, subroutines, segments in program code, drivers, firmware, microcode, circuits, data, a database, data structures, tables, arrays, and variables.

Components and functions provided in 'unit(s)' may be coupled to a smaller number of components and 'unit(s)' or divided into a larger number of components and 'unit(s).'

In addition, components and 'unit(s)' may be implemented to run one or more CPUs in a device or secure multimedia card.

The methods for supplying power by using a printing apparatus supporting USB type-C according to the embodiments described via FIGS. 2 to 14 may be each implemented in the form of a computer-readable medium that stores instructions and data that can be executed by a computer. In this case, the instructions and the data may be stored in the form of program code, and may generate a predetermined program module and perform a predetermined operation when executed by a processor. Furthermore, the computer-readable medium may be any type of available medium that can be accessed by a computer, and may include volatile, non-volatile, separable and non-separable media. Furthermore, the computer-readable medium may be a computer storage medium.

The computer storage medium may include all volatile, non-volatile, separable and non-separable media that store information, such as computer-readable instructions, a data structure, a program module, or other data, and that are implemented using any method or technology. For example, the computer storage medium may be a magnetic storage medium such as an HDD, an SSD, or the like, an optical storage medium such as a CD, a DVD, a Blu-ray disk or the like, or memory included in a server that can be accessed over a network.

Furthermore, the methods for supplying power by using a printing apparatus supporting USB type-C according to the embodiments described via FIGS. 2 to 14 may be each implemented as a computer program (or a computer program product) including computer-executable instructions. The computer program includes programmable machine instructions that are processed by a processor, and may be implemented as a high-level programming language, an object-oriented programming language, an assembly language, a machine language, or the like. Furthermore, the computer program may be stored in a tangible computer-readable storage medium (for example, memory, a hard disk, a magnetic/optical medium, a solid-state drive (SSD), or the like).

Accordingly, the methods for supplying power by using a printing apparatus supporting USB type-C according to the embodiments described via FIGS. 2 to 14 may be each implemented in such a manner that the above-described computer program is executed by a computing apparatus. The computing apparatus may include at least some of a processor, memory, a storage device, a high-speed interface connected to memory and a high-speed expansion port, and a low-speed interface connected to a low-speed bus and a storage device. These individual components are connected using various buses, and may be mounted on a common motherboard or using another appropriate method.

In this case, the processor may process instructions within a computing apparatus. An example of the instructions is instructions which are stored in memory or a storage device in order to display graphic information for providing a Graphic User Interface (GUI) onto an external input/output device, such as a display connected to a high-speed interface. As another embodiment, a plurality of processors and/or a plurality of buses may be appropriately used along with a plurality of pieces of memory. Furthermore, the processor may be implemented as a chipset composed of chips including a plurality of independent analog and/or digital processors.

Furthermore, the memory stores information within the computing device. As an example, the memory may include a volatile memory unit or a set of the volatile memory units. As another example, the memory may include a non-volatile memory unit or a set of the non-volatile memory units. Furthermore, the memory may be another type of computer-readable medium, such as a magnetic or optical disk.

In addition, the storage device may provide a large storage space to the computing device. The storage device may be a computer-readable medium, or may be a configuration including such a computer-readable medium. For example, the storage device may also include devices within a storage area network (SAN) or other elements, and may be a floppy disk device, a hard disk device, an optical disk device, a tape device, flash memory, or a similar semiconductor memory device or array.

Embodiments of a printing apparatus control system and method for providing information related to the occurrence of an error in a printing apparatus to a user will be described below.

The following embodiments may relate to various methods for providing various types of information related to the occurrence of errors in a printing apparatus. In the following, the "printing apparatus" may include, e.g., a laser printing apparatus, an inkjet printing apparatus, a dot printing apparatus, a thermal printing apparatus, and the like according to their output method. Alternatively, the "printing apparatus" may include, e.g., a label printing apparatus, a barcode printing apparatus, a photo printing apparatus, a receipt printing apparatus, a mobile printing apparatus, and the like according to their use. The above-described types of printing apparatuses are described as examples, and thus the "printing apparatus" may include all types of devices that perform printing on printing media.

In the following, the information related to occurrence of an error in a printing apparatus may include error information about an error having occurred in the printing apparatus, solution information corresponding to each piece of error information, information related to the maintenance of the printing apparatus, and the like.

In this case, the error information may include, e.g., an error related to the stopping of the printing operation of the printing apparatus, an error related to the printing quality of a product printed by the printing apparatus, and the like. For example, the error related to the stopping of the printing operation of the printing apparatus may include a network connection failure, a paper jam, door opening, paper exhaustion, a motor malfunction, a print head malfunction, and the like. Furthermore, for example, the error related to the printing quality of a product printed by the printing apparatus may include a paper type error, a paper size error, a paper alignment error, an error related to the temperature of a print head, an error related to the temperature of a motor, and the like.

Furthermore, the solution information corresponding to error occurrence information may include information adapted to guide a user through the direct solution of an error having occurred in the printing apparatus (e.g., the page information of a user manual, moving image access information, or the like), information adapted to allow a user to indirectly solve an error having occurred in the printing apparatus (e.g., the contact information of a related after-sales service department, information about orders for various types of consumables, or the like), and the like.

Furthermore, the information related to the "maintenance" of the printing apparatus may include the condition information of various types of consumables, including the replacement time information of various types of consumables, the remaining amount of paper, the remaining amount of ink and the like, such as paper exhaustion, ink ribbon replacement, toner replacement, print head wear, roller wear, and the like.

The above-described information related to the occurrence of an error in the printing apparatus is described as examples, and may include all types of error information related to the stopping of a printing operation or the exertion of an influence on a printing product, solution information corresponding to each error, and various types of state information adapted to provide the convenience of use of the apparatus to a user. In this case, a method of providing information related to the occurrence of an error in the printing apparatus may be various, which will be described in detail in related portions in detail.

Figure 15:
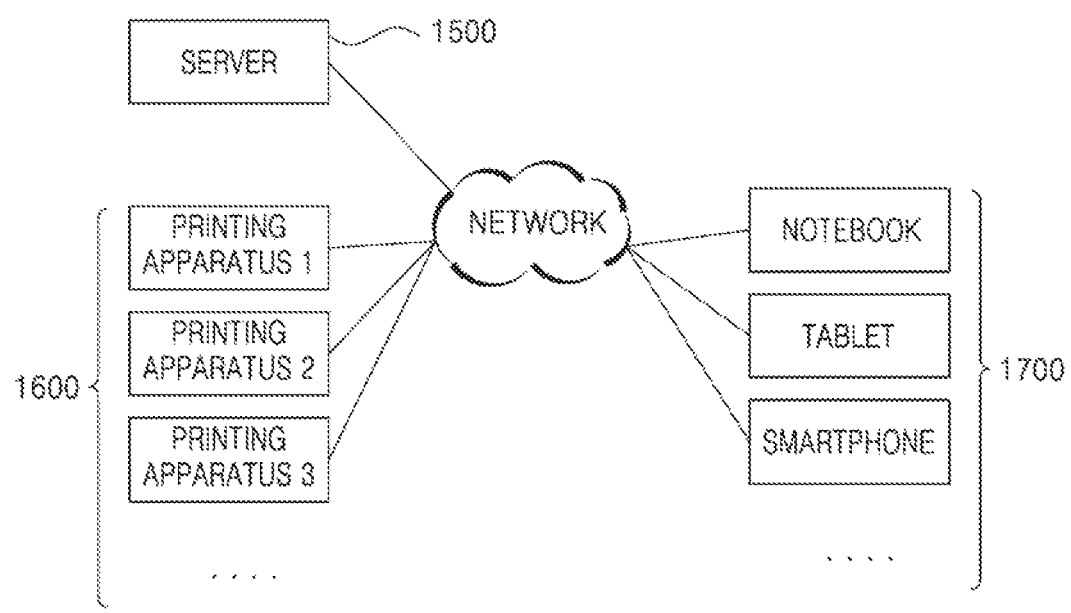
FIG. 15 is a diagram illustrating the overall environment of printing apparatus control systems according to embodiments of the present application.

The overall environment of the printing apparatus control systems according to embodiments of the present application will be schematically described with reference to FIGS. 15. FIG. 15 is a diagram illustrating the overall environment of the printing apparatus control systems according to the embodiments of the present application.

Referring to FIG. 15, the printing apparatus control systems according to embodiments of the present application may include a server 1500, one or more printing apparatuses 1600, and one or more user devices 1700. The server 1500, the printing apparatuses 1600, and the user devices 1700 may be connected over a network N, and the network N may be, e.g., a wired or wireless communication network. The configuration of each of the devices will be described in detail below.

The server 1500 may be a device configured to manage all operations related to printing performed in the one or more printing apparatuses 1600 connected over the network N. In this case, the server 1500 may transmit and receive various types of data related to printing to and from the one or more printing apparatuses 1600 and/or the user devices 1700.

For example, the server 1500 may receive one or more pieces of print data and one or more print requests from the user devices 1700. Furthermore, for example, the server 1500 may transmit a print command to at least one of the one or more printing apparatuses 1600 in order to perform a printing operation in at least one of the one or more printing apparatuses 1600 present in the network N.

Furthermore, the server 1500 may monitor the statuses of the one or more printing apparatuses 1600 connected over the network N. For example, the server 1500 may monitor the setting information, task list, print results, and error occurrence of each of the printing apparatuses 1600, a state related to the maintenance of the printing apparatus, and the like.

For example, the server 1500 may monitor the statuses of the printing apparatuses 1600 connected over the network N in real time or at preset intervals. For example, the server 1500 may identify at least one error status having occurred in the printing apparatus 1600, and may search for solution information corresponding to the error status. In this case, the solution information corresponding to the error occurrence may be previously stored in separate memory (not shown) located within the server 1500. Alternatively, the server 1500 may acquire solution information corresponding to the error occurrence from an external device. For example, the server 1500 may search the memory for solution information corresponding to the error occurrence, and may transmit the solution information corresponding to the error occurrence to the printing apparatus 1600 in which the error has occurred. Alternatively, for example, the server 1500 may directly transmit the solution information corresponding to the error occurrence to the user device 1700. Detailed methods for providing solution information about various types of error occurrences via the server 1500 and/or the printing apparatus 1600 will be described in detail in the following related embodiments.

The above-described functions of the server 1500 are described as examples, and various functions for managing the operations of one or more printing apparatuses may be provided. In this case, each of the functions may be performed by one or more modules located on the server 1500, and may be provided onto the user device 1700 via a software application program, a website, an application for a portable terminal, or the like.

Furthermore, a plurality of servers configured to perform the above-described functions of the server 1500 may be present, and the functions may be performed in one or more servers in parallel. Furthermore, at least one of the plurality of printing apparatuses 1600 connected over the network N may replace the above-described functions of the server 1500. For ease of description, the following description will be given based on a case where a single server 1500 manages a plurality of printing apparatuses 1600.

Figure 16:
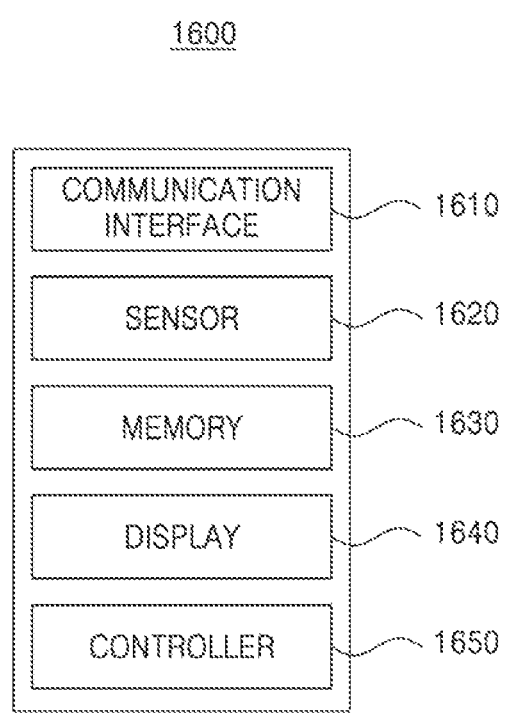
FIG. 16 is a block diagram illustrating the components of printing apparatuses according to embodiments of the present application as an example.
Figure 17:
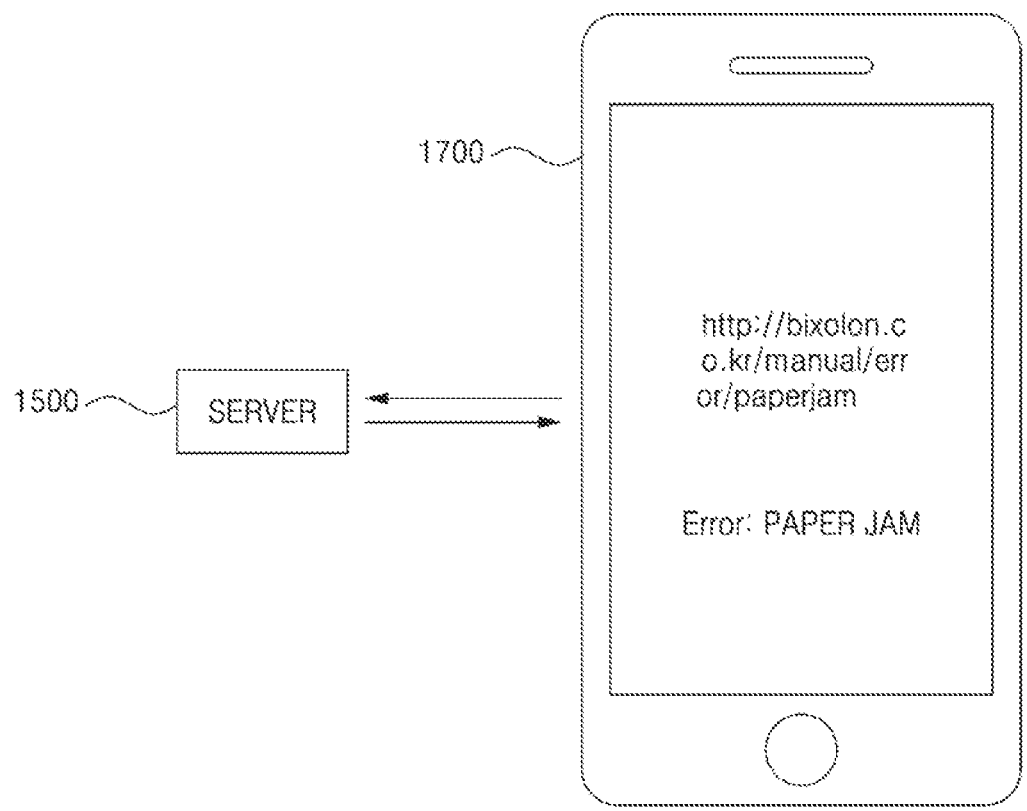
FIGS. 17 and 18 are views illustrating a method of controlling a printing apparatus according to embodiments of the present application as an example.

The printing apparatus 1600 may be an apparatus for printing data including text and images on printing media, and may include all types of printing apparatuses described above. FIG. 16 is a block diagram illustrating the components of printing apparatuses according to embodiments of the present application as an example. For example, the printing apparatuses 1600 may each include a communication interface 1610, one or more sensors 1620, memory 1630, a display 1640, and a controller 1650. The individual components will be described in detail below.

The communication interface 1610 may be a component configured to communicate with the above-described server 1500, other printing apparatuses 1600, the user terminals 1700, and other peripheral devices. For example, the wired communication module may include a USB-type module, a serial-type module, a parallel-type module and the like, and the printing apparatus 1600 may communicate with an external electronic device via the wired communication module. Alternatively, for example, the wireless communication module may include Internet communication modules such as a Wi-Fi module and short-range communication modules such as Bluetooth, ZigBee, WiGig, Radio Frequency IDentification (RFID), Near Field Communication (NFC) and Infrared Data Association (IrDA) modules, and the printing apparatus 1600 may communicate with an external electronic device via the wireless communication module.

The sensor 1620 may be a component configured to detect the state of the printing apparatus 1600, and one or more sensors may be provided in a module foam. For example, the sensor 1620 may include a print head sensor, a motor sensor, a housing sensor, a paper feed sensor, a paper location sensor, and the like. The above-described sensors are described as examples, and the printing apparatus 1600 may be provided with various types of one or more sensors configured to detect other states related to the printing operation.

The memory 1630 may be a component configured to store various types of commands and/or data required for the operation of the printing apparatus 1600. For example, the memory 1630 may store various types of data related to the printing operation. Furthermore, for example, an application program (e.g., firmware) configured to control a printing operation that is performed by the printing apparatus 1600 may be stored in the memory 1630. The memory 1630 may include at least one type of storage medium selected from a flash memory-type medium, a hard disk-type medium, a multimedia card micro-type medium, card-type memory (e.g., SD or XD memory, or the like), random access memory (RAM), read-only memory (ROM), electrically erasable programmable read-only memory (EEPROM), magnetic memory, a magnetic disk, and an optical disk.

The display 1640 may be a component configured to display the information of the above-described printing apparatus 1600. For example, the display 1640 may include at least one of a liquid crystal display, a thin film transistor liquid crystal display, organic light-emitting diodes, a flexible display, and a 3D display. When the display 1640 and a sensor (hereinafter referred to as a "touch sensor") configured to detect touch operation form a mutual layer structure (hereinafter referred to as a "touch screen"), the display 1640 may be used as not only an output device but also an input device. In other words, the printing apparatus 1600 may further display a graphical user interface (GUI) configured to interface with a user via the display 1640, and a user may input data and/or commands related to a printing operation via the user interface provided via the display 240.

The controller 1650 may be a component configured to control all operations related to the printing operation of the printing apparatus 1600. For example, the controller 1650 may control a printing operation according to an application program (e.g., firmware) stored in the memory 1630. In this case, the firmware may be implemented in a software form, and required functions may be provided to the printing apparatus 1600 via the controller 1650.

Furthermore, the controller 1650 may check various types of state information of the printing apparatus 1600 detected via the above-described one or more sensors. Furthermore, the controller 1650 may control the display 1640 to display a message, solution information and the like corresponding to the state information via the above-described display 1640. For example, when a signal indicative of paper exhaustion is detected by the paper sensor, the controller 1650 may control the display 1640 to display a message indicative of paper exhaustion via the display 1640. Detailed descriptions of various types of control operations that are performed by the controller 1650 will be given in related portions.

Each of the user devices 1700 is a device configured to request printing from at least one of the one or more printing apparatuses 1600 connected over the network N. For example, the user device 1700 may include a desktop, a laptop, a tablet device, a smartphone and the like.

Accordingly, a user may transmit and receive various types of commands and/or data related to a printing operation via a software program executed on the user device 1700, a website provided by the above-described server 1500, an application for a portable terminal, or the like.

Figure 18:
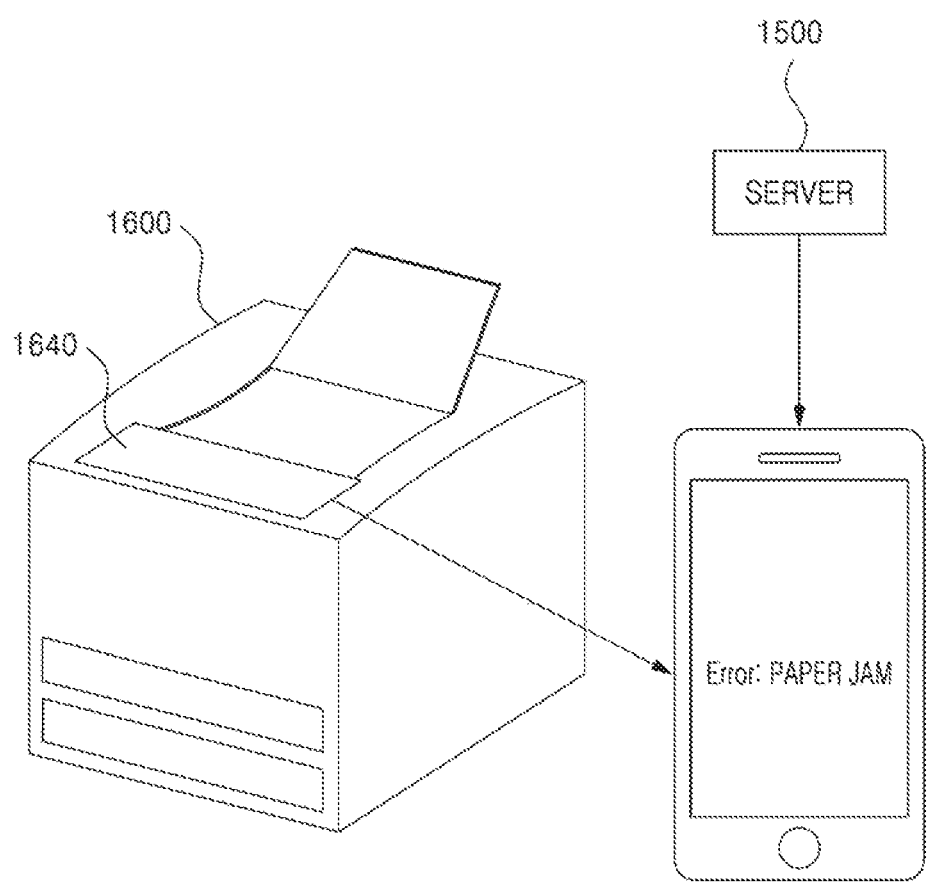

Alternatively, the user device 1700 may be a device configured to acquire error information about an error having occurred in at least one of the one or more printing apparatuses 1600, error solution information, and/or maintenance information from the server 1500. Referring to FIG. 3, for example, when a paper jam error occurs while the printing apparatus 1600 is performing a printing operation in response to a request from a user, the server 1500 may directly transmit URL information, including error solution information corresponding to error occurrence information acquired from the printing apparatus 1600, to the user device 1700. Alternatively, for example, a user may request appropriate error solution information adapted to process error occurrence information having occurred in the printing apparatus 1600 via an application executed on the user device 1700. Alternatively, as shown in FIG. 18, for example, a user may acquire a 2D identification code including error solution information displayed via the display 1640 of the printing apparatus 1600. In this case, the error solution information may be provided in a unique identification image form (e.g., a QR code) identifiable on the user device 1700, and the user device 1700 may acquire error solution information corresponding to the QR code from the above-described server 1500. A detailed description of a method of providing error solution information provided via the user device 1700 will be given in a related portion.

Various embodiments of a printing apparatus control method for providing information related to the occurrence of an error in the printing apparatus will be described in detail below.

Figure 19:
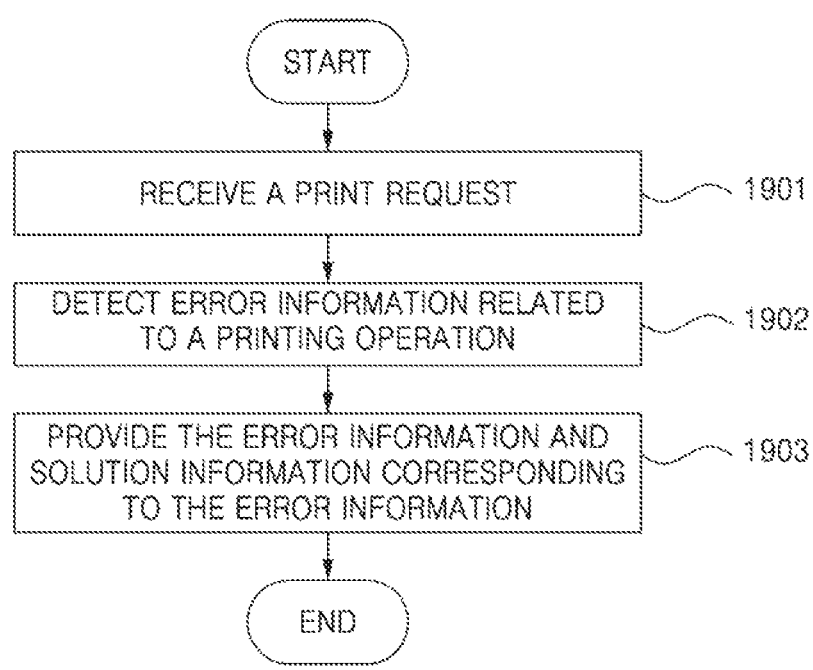
FIG. 19 is a flowchart illustrating a method for controlling a printing apparatus according to one embodiment of the present application.

FIG. 19 is a flowchart illustrating a method for controlling a printing apparatus according to one embodiment of the present application. Referring to FIG. 19, the method for controlling a printing apparatus according to the present embodiment of the present application may include step 1901 of receiving a print request, step 1902 of detecting error information related to a printing operation, and step 1903 of providing error information and solution information corresponding to the error information. For ease of description, a case where individual steps are performed via the controller 1650 of the above-described printing apparatus 1600 will be described as an example below.

The controller 1650 may receive an input print request from a user at step 1901.

For example, a user may input a print request via a software program (e.g., an application) executed on the user device 1700. In this case, the server 1500 may transfer the print request to the printing apparatus 1600 connected to the user device 1700 over the network N.

Accordingly, the printing apparatus 1600 may receive a print request input by a user, and may perform a printing operation based on the print request. The print request may include, e.g., a print command, print data and/or the like.

The controller 1650 may detect error information related to the printing operation based on the print request at step 1902.

For example, the controller 1650 may detect error information having occurred in the printing apparatus based on the status information of the printing apparatus detected by the sensor 1620. The sensor 1620 may include a print head sensor, a motor sensor, a housing sensor, a paper feed sensor, a paper location sensor and the like, as described above. For example, when the door of the printing apparatus 1600 is in an open state, a signal corresponding to door opening may be detected by the housing sensor, and the controller 1650 determines that an error has occurred in the printing apparatus 1600 based on the signal detected by the housing sensor. Alternatively, for example, when a paper jam phenomenon occurs in a printing path during the printing operation of the printing apparatus 1600, a signal corresponding to a paper jam may be detected by the paper feed sensor, and the controller 1650 may determine that an error has occurred in the printing apparatus 1600 based on the signal detected by the paper feed sensor.

Furthermore, the controller 1650 may provide error information and solution information corresponding to the error information at step 1903.

When it is determined at step 1902 that an error has occurred in the printing apparatus 1600, the controller 1650 may search for solution information corresponding to the detected error information. For example, the solution information may be previously stored in the memory 1630 of the printing apparatus 1600. Alternatively, for example, when an error is detected, the controller 1650 may request appropriate solution information from the above-described server 1500, and may acquire at least one piece of solution information from the server 1500.

For example, the solution information may include at least one of text information, image information, URL information, the contact information of a corresponding error-related department, and moving image access information. As an example, the text information may include instructions on how to solve an error state, and the image information may be one or more pieces of image information intuitively indicating an error occurrence state and a solution method. Furthermore, as an example, the URL information may be the URL information of a website providing a manual related to the solution of the error state, and the moving image access information may be information for access to a moving image showing an error state solution method. The above-described solution information has been described as an example, and all types of information helping to solve an error having occurred in the printing apparatus may be provided in various forms.

Accordingly, the controller 1650 may generate a message including at least one of the error information and/or the solution information, and may provide the message via the display 1640 or the user device 1700. Alternatively, the controller 1650 may generate a unique identification image including at least one of the solution information, and may provide the unique identification image via the display 1640 or the user device 1700. For example, the unique identification image may be a 2D identification code (e.g., a QR code, a barcode, or the like). In this case, the controller 1650 may generate a 2D identification code including at least one piece of solution information acquired from the memory 1630 or the server 1500.

As an example, when error information corresponding to the door opening of the printing apparatus 1600 is detected, the controller 1650 may check solution information corresponding to the door opening stored in the memory 1630. In this case, the controller 1650 may transmit the error information and the error solution information acquired from the memory 1630, e.g., text information including instructions on how to solve the error, to the display 1640 or the user device 1700. Alternatively, for example, the controller 1650 may generate a unique identification image (e.g., a 2D identification code) including the error solution information acquired from the memory 1630, e.g., at least one of instructions on how to solve the error, and may transmit the error information and the 2D identification code to the display 1640 or the user device 1700.

As another example, when error information corresponding to a paper jam is detected during the printing operation of the printing apparatus 1600, the controller 1650 may acquire solution information corresponding to the paper jam from the server 1500. In this case, the controller 1650 may transmit a message including the error information and error solution information acquired from the server 1500, e.g., moving image access information adapted to solve the error, to the display 1640. Alternatively, for example, the controller 1650 may generate a unique identification image (e.g., a 2D identification code) including error solution information acquired from the server 1500, e.g., moving image access information adapted to solve the error, and may transmit the error information and the 2D identification code to the display 1640 or the user device 1700.

In other words, the controller 1650 may transmit the error information and solution information corresponding to each error to the display 1640 or the user device 1700, and a user may check the error information and the corresponding solution information displayed on the display 1640 or the user device 1700. Accordingly, the user may rapidly determine the solution information corresponding to the error state while checking the error information having occurred in the printing apparatus 1600.

Meanwhile, at the step of preparing or performing a printing operation based on a print request received from a user, in the case where a plurality of errors is detected simultaneously, it may be difficult to provide all error information and solution information at one time. In this case, it may be preferable to efficiently provide error solution information according to preset criteria. A printing apparatus control method for providing error solution information in the case where a plurality of errors is detected within a single printing apparatus will be described with reference to FIG. 6 in detail below.

Figure 20:
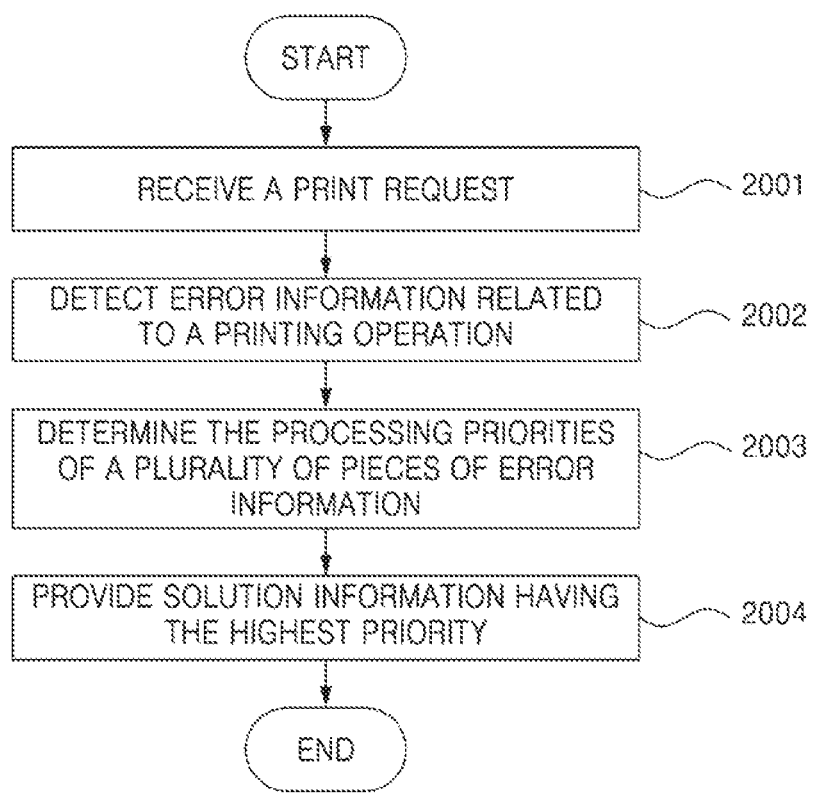
FIG. 20 is a flowchart illustrating a method for controlling a printing apparatus according to another embodiment of the present application.

FIG. 20 is a flowchart illustrating a method for controlling a printing apparatus according to another embodiment of the present application. Referring to FIG. 20, the method for controlling a printing apparatus according to the other embodiment of the present application may include step 2001 of receiving a print request, step 2002 of a plurality of pieces of error information related to a printing operation, step 2003 of determining the processing priorities of the plurality of pieces of error information, and step 2004 of providing solution information having the highest priority. For ease of description, a case where individual steps are performed via the controller 1650 of the above-described printing apparatus 1600 will be described below.

The controller 1650 may receive a print request input by a user 2001.

For example, the user may input the print request via a software program (e.g., an application) executed on the user device 1700. In this case, the server 1500 may transfer the print request to the printing apparatus 1600 connected to the user device 1700 over the network N.

Accordingly, the printing apparatus 1600 may receive the print request input by the user, and may perform a printing operation based on the print request. The print request may include, for example, a print command, print data and/or the like.

The controller 1650 may detect a plurality of pieces of error information related to the printing operation at step 2002.

The plurality of pieces of error information may include one or more of an error related to the stopping of the printing operation of the printing apparatus, and errors related to the printing quality of a product printed by the printing apparatus, as described above.

As described above, the error related to the stopping of the operation of the printing apparatus 1600 may include, for example, a network connection failure, a paper jam, door opening, paper exhaustion, a motor malfunction, a print head malfunction, and the like. Furthermore, the error related to the printing quality of a product printed by the printing apparatus 1600 may be an error unrelated to the stopping of the operation of the printing apparatus 1600, and may include, for example, a paper type error, a paper size error, a paper alignment error, an error related to the temperature of the print head, an error related to the temperature of the motor, and the like.

As an example, the controller 1650 may detect error information about the stopping of the printing operation of the printing apparatus 1600, e.g., error information corresponding to door opening and error information corresponding to a paper jam. Alternatively, the controller 1650 may detect error information related to printing quality, e.g., error information corresponding to a paper type error and error information corresponding to paper misalignment. Alternatively, the controller 1650 may detect error information related to the stopping of the printing operation of the printing apparatus 1600 (e.g., door opening) and error information unrelated to the stopping of the printing operation of the printing apparatus 1600 (e.g., a paper type error).

The controller 1650 may determine the processing priorities of the plurality of pieces of error information at step 2003.

For example, the processing priorities of the plurality of pieces of error information may be previously determined by a user or previously stored in the memory 1630. Alternatively, when a plurality of errors is detected, the controller 1650 may provide a user interface configured to receive the processing priorities of the plurality of errors from the user onto the display 1640 or the user device 1700.

As an example, at step 2002, the controller 1650 may detect error information corresponding to door opening and an error corresponding to a paper jam. For example, when it is determined based on processing priority information stored in the memory 1630 that the error corresponding to a paper jam has a higher priority than the error corresponding to door opening, the controller 1650 determines to preferentially process the error corresponding to a paper jam. Alternatively, for example, the controller 1650 provides the error corresponding to door opening and the error occurrence corresponding to a paper jam via the above-described display 1640 or user device 1700, and may provide a user interface configured to allow an error, to be preferentially processed, to be selected from the plurality of pieces of error information. In this case, when the user selects the preferential processing of the error corresponding to a paper jam, it may be determined that the error corresponding to a paper jam be preferentially processed.

As another example, at step 2002, the controller 1650 may detect error information corresponding to door opening and an error corresponding to a paper type error. In this case, the controller 1650 may be preset to preferentially process an error state related to the stopping of a printing operation. For example, the controller 1650 may determine to preferentially process an error corresponding to door opening, i.e., an error state related to the stopping of a printing operation, selected from the door opening and the paper type error.

As another example, at step 2002, the controller 1650 may detect error information corresponding to a paper type error and error information related to the temperature of the print head. In this case, it is determined based on the processing priority information stored in the memory 1630 that the paper type error has a higher priority that the error related the temperature of the print head, the controller 1650 may determine to preferentially process the paper type error. Alternatively, for example, the controller 1650 provides the paper type error and the error occurrence related to the temperature of the print head via the above-described display 1640 or user device 1700, and may provide a user interface in order to allow an error, to be preferentially processed, to be selected from the plurality of pieces of error information. In this case, when the user selects the preferential processing of the error related to the temperature of the print head, it may be determined that the error related to the temperature of the print head be preferentially processed.

The controller 1650 may provide solution information having the highest priority at step 2004.

In other words, the controller 1650 may preferentially provide the plurality of pieces of error information and solution information corresponding to the error state determined to be preferentially processed at step 2003.

For example, the controller 1650 may generate a message preferentially including the plurality of pieces of error information and information about solution to an error state related to the stopping of the printing operation selected from the plurality of pieces of error information.

Alternatively, for example, the controller 1650 may generate a message preferentially including the plurality of pieces of error information and information about solution to an error state selected from the plurality of pieces of error information based on preset priorities.

Alternatively, for example, the controller 1650 may generate a message preferentially including information about the solution to an error state selected from the plurality of pieces of error information based on priorities input by a user.

In this case, the solution information may be provided in an error solution message form or a unique identification image form, as described above. Furthermore, the solution information may be displayed via the display 1640.

As an example, when error information corresponding to door opening and an error corresponding to a paper type error are detected and also it is determined that the error corresponding to door opening, i.e., an error state related to the stopping of a printing operation, be preferentially processed, the controller 1650 may transmit a message including the error information corresponding to the door opening and the paper type error and the solution information corresponding to door opening to the display 1640 or the user device 1700. For example, the message may include error code information indicative of the door opening and the paper type error and solution information corresponding to the door opening. Alternatively, for example, the controller 1650 may generate a unique identification image including solution information corresponding to the door opening, and may transmit not only error code information indicative of the door opening and the paper type error but also the unique identification image to the display 1640 or the user device 1700.

In this case, the controller 1650 may selectively provide only solution information for error information determined to be preferentially processed and selected from a plurality of errors, or solution information corresponding to remaining error information may be sequentially provided. Alternatively, the controller 1650 may selectively provide only solution information for error information determined to be preferentially processed, and may then provide solution information corresponding to remaining error information only when a user makes a request.

Therefore, in accordance with the method for controlling a printing apparatus according to the other embodiment of the present application, when a plurality of pieces of error information is detected, solution information corresponding to error information is selectively or sequentially provided based on priorities, thereby allowing for a user to efficiently solve the error states having occurred in the printing apparatus.

In some embodiments, depending on the type of error, it may be efficient to stop the operation of the printing apparatus until an error state is solved by a user. Alternatively, it may be efficient to continue the operation of the printing apparatus regardless of whether or not an error state is solved by a user. A method of controlling the operation of the printing apparatus when an error occurs in the printing apparatus will be described in detail below.

Figure 21:
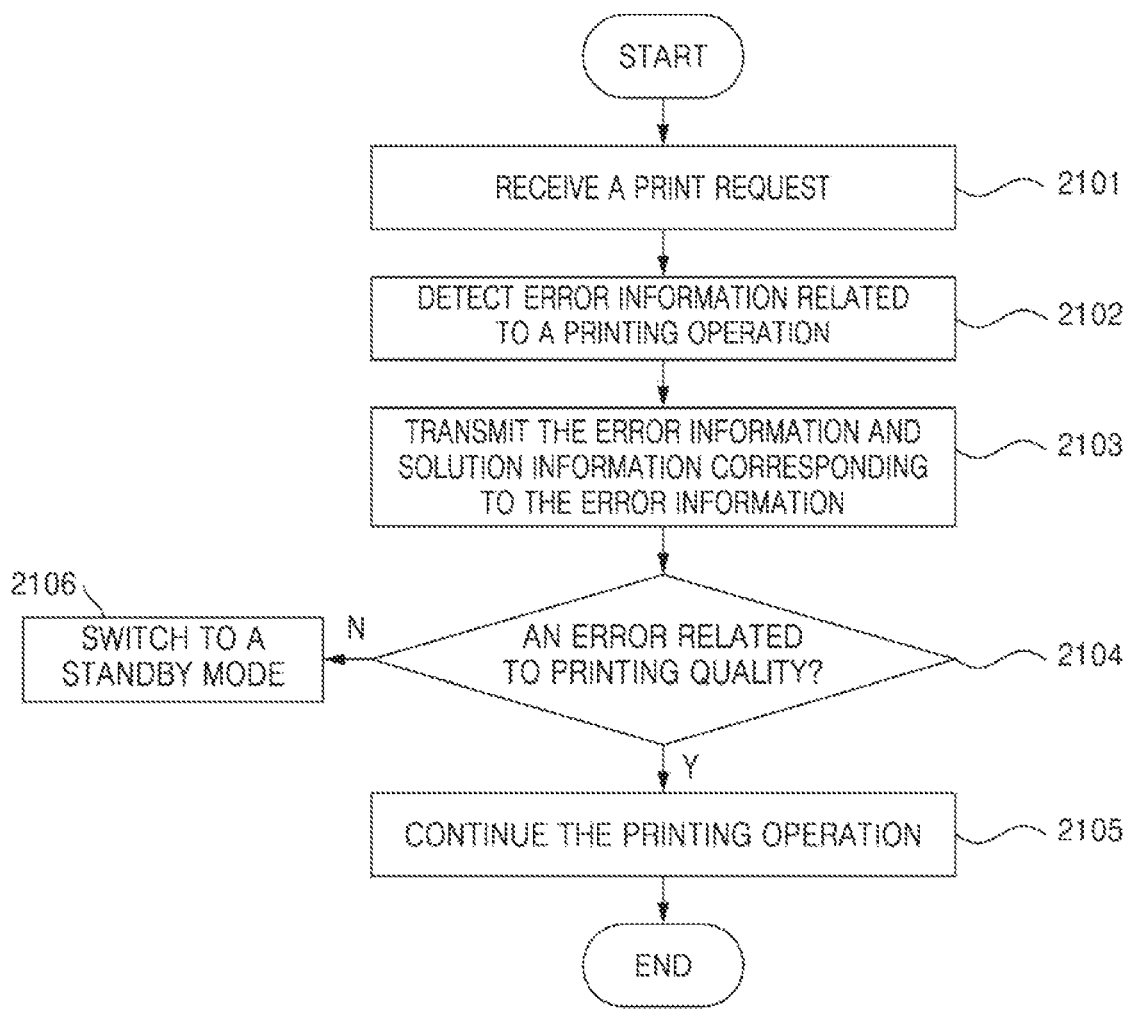
FIG. 21 is a flowchart illustrating a method for controlling a printing apparatus according to another embodiment of the present application as an example.

FIG. 21 is a flowchart illustrating a method for controlling a printing apparatus according to another embodiment of the present application as an example. Referring to FIG. 21, the method for controlling a printing apparatus according to the present embodiment of the present application may include step 2101 of receiving a print request from a user, step 2102 of detecting error information related to a printing operation, step 2103 of transmitting error information and solution information corresponding to the error information, step 2104 of determining whether or not an error in question is an error related to printing quality, step 2105 of continuing a printing operation when it is determined that the error in question is an error related to printing quality, and step 2106 of switching the operation mode of the printing apparatus to a standby mode when the error in question is not an error related to printing quality. For ease of description, a case where individual steps are performed via the controller 1650 of the above-described printing apparatus 1600 will be described as an example below.

The controller 1650 may receive a print request from a user at step 2101, may detect error information related to a printing operation at step 2102, and may transmit the error information and solution information corresponding to the error information at step 2103. Since steps 2101 to 2103 may correspond to the above-described steps 1901 to 1903 or the above-described steps 2001 step to 2003, detailed descriptions thereof will be omitted below.

In this case, the controller 1650 may further determine whether or not the error information is an error related to printing quality at step 2104, and may continue a printing operation when the error information is an error related to printing quality at step 2105. For example, the controller 1650 may continue the printing operation without switching the operation mode when the temperature of the head of the printing apparatus deviates from a preset range. The reason for this is that the printing of a product even with lower quality is more efficient than the stopping of printing depending on the printing purpose of a user because printing can be performed even when the temperature of the print head deviates from the preset range.

In contrast, the controller 1650 may maintain the operation mode of the printing apparatus 1600 in a standby mode until a state corresponding to the error is solved when the error information is not an error related to printing quality at step 2106. For example, the reason for this is that the printing operation cannot be performed when an error related to the stopping of the printing operation, such as door opening, paper jam, or the like other than an error related to printing quality occurs. Accordingly, the controller 1650 may stop the printing operation or put the printing apparatus 1600 into a standby mode until an error state is solved by a user.

Meanwhile, whether or not to stop the printing operation by the controller 1650 may be preset by a user as desired. For example, before the start of a printing operation, a user may make a setting such that an operation mode is switched to a standby mode despite an error related to printing quality in the case where an error related to the initial setting information of the printing apparatus, such as a paper type error, a paper size error, or the like, occurs.

Furthermore, in some embodiments, when solution information for all errors that may occur in the printing apparatus is searched for and provided to all users in the same manner, waste may occur in terms of time and/or cost. Therefore, it may be efficient to provide only error occurrence information for a specific error preset according to the knowledge level, authority, and/or the like of each user.

Figure 22:
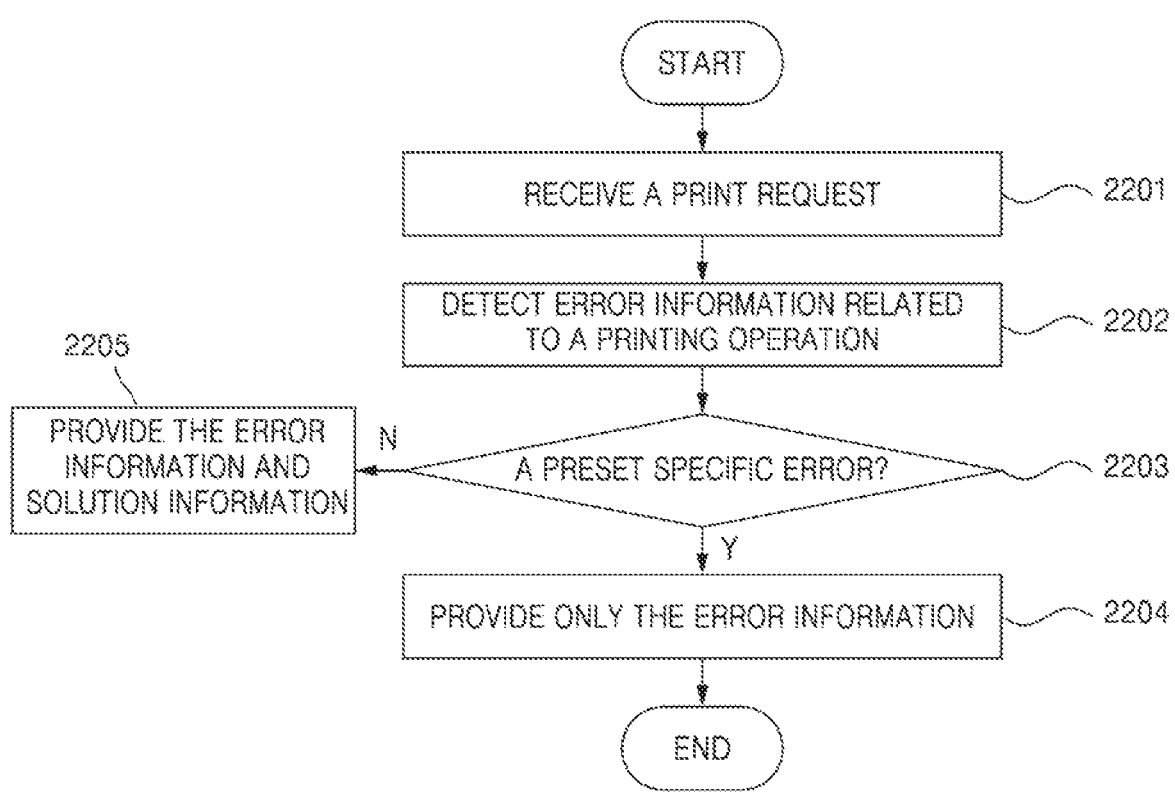
FIG. 22 is a flowchart illustrating a method for controlling a printing apparatus according to another embodiment of the present application as an example.

FIG. 22 is a flowchart illustrating a method for controlling a printing apparatus according to another embodiment of the present application as an example. Referring to FIG. 22, the method may include step 2201 of receiving a print request from a user, step 2202 of detecting error information related to a printing operation, step 2203 of determining whether or not an error in question is a preset specific error, step 2204 of providing only error information when the error in question is a preset specific error, and step 2205 of providing error information and solution information when the error in question is not the preset specific error. For ease of description, a case where individual steps are performed via the controller 1650 of the above-described printing apparatus 1600 will be described as an example below.

The controller 1650 may receive a print request from a user at step 2201, and may detect error information related to a printing operation at step 2202. Since steps 2201 and 2202 may correspond to the above-described steps 1901 and 1902 or the above-described steps 2001 and 2002, respectively, detailed descriptions thereof will be omitted below.

In this case, the controller 1650 may further determine whether or not the error information detected at step 2202 is a preset specific error at step 2203, and may provide only error information corresponding to the preset specific error when the preset specific error occurs at step 2204.

The preset specific error may be, for example, a paper exhaustion error. In this case, the controller 1650 may acquire code information corresponding to the paper exhaustion error stored in memory 1630, and may generate a message including the code information. In other words, the message may not include solution information corresponding to the paper exhaustion error.

Furthermore, the specific error may be information preset according to the knowledge level of a user, the authority of the user, the preference of the user, and/or the like. In this case, the specific error may be previously stored in the memory 1630 of the printing apparatus 1600 or the server 1500. Alternatively, the controller 1650 may determine that there is no need to provide solution information for an error state having occurred a preset number of times or more for each error. For example, when determining the processing priorities of a plurality of pieces of error information at step 2003, the controller 1650 may determine that there is no need to provide corresponding solution information when it is determined that a corresponding error state has occurred a preset number of times or more even in the case where priority is set for an error state that stops a printing operation. Accordingly, the controller 1650 does not need to provide solution information corresponding to an error state that stops the printing operation.

In contrast, the controller 1650 may provide error information and solution information according to the above-described step 1903 or 2003 when it is determined that the error having occurred at step 2202 is not the preset specific error at step 2205.

Meanwhile, the type of solution information that is provided may vary depending on the knowledge level of a user, the authority of the user, the preference of the user, and/or the like. For example, when the user of the corresponding printing apparatus is a general employee, solution information including moving image access information may be provided. Alternatively, for example, when the user of the corresponding printing apparatus is the administrator of the printing apparatus, solution information including only instructions on how to solve the error state may be provided.

Accordingly, according to another embodiment of the present application, it may be possible to efficiently provide only an appropriate level of solution information according to a user.

Furthermore, as described above, the controller 1650 may generate a unique identification image including at least one piece of solution information, and may provide the unique identification image onto the display 1640 or the user device 1700. However, even in this case, a problem arises in that a user may not appropriately utilize the unique identification image despite the provision of the unique identification image in the case where a user device is not present near the printing apparatus in which an error has occurred.

Figure 23:
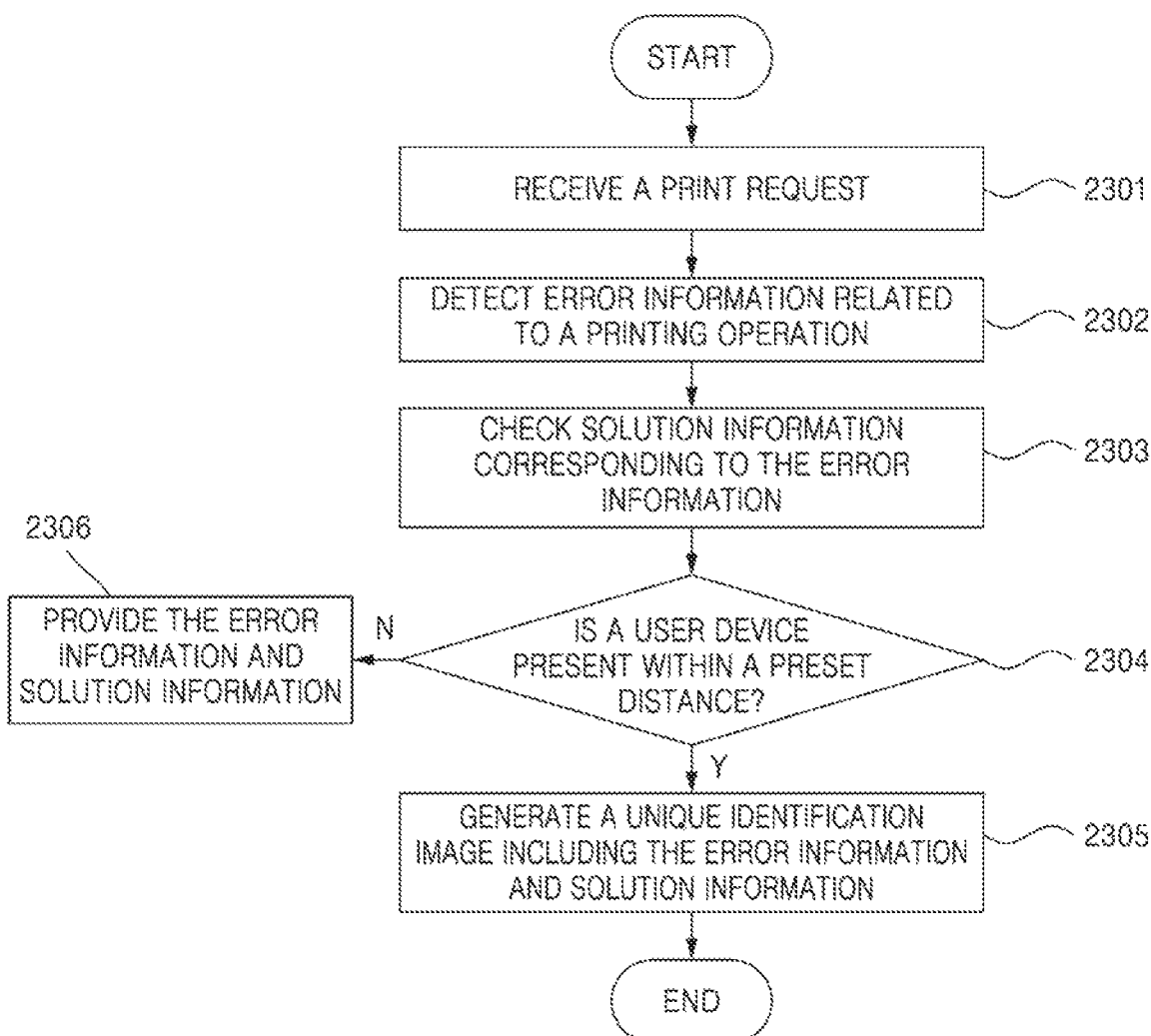
FIG. 23 is a flowchart illustrating a method for controlling a printing apparatus according to another embodiment of the present application as an example.

FIG. 23 is a flowchart illustrating a method for controlling a printing apparatus according to another embodiment of the present application as an example. Referring to FIG. 23, the method may include step 2301 of receiving a print request from a user, step 2302 of detecting error information related to a printing operation, step 2303 of checking solution information corresponding to the error information, step 2304 of determining whether or not a user device is present within a preset distance, step 2305 of generating a unique identification image including error information and solution information when a user device is not present within the preset distance, and step 2306 of transmitting the error information and the solution information when a user device is not present within the preset distance. For ease of description, a case where individual steps are performed via the controller 1650 of the above-described printing apparatus 1600 will be described as an example below.

The controller 1650 may receive a print request from a user at step 2301, and may detect error information related to a printing operation at step 2302. Since steps 2301 and 2302 may correspond to the above-described steps 1901 and 1902 or the above-described steps 2001 and 2002, respectively, detailed descriptions thereof will be omitted below.

Furthermore, the controller 1650 checks solution information corresponding to the error information, detected at step 2302, at step 2303. For example, the controller 1650 may acquire solution information corresponding to the error information from the memory 1630. Alternatively, for example, the controller 1650 may request solution information corresponding to the error information from the server 1500.

In this case, as described above, the controller 1650 may provide solution information corresponding to the error information to the user in a unique identification image form.

In this case, the controller 1650 may determine whether or not the user device 1700 is present within a preset distance from the printing apparatus 1600 that will perform a printing operation at step 2304. More specifically, at step 2304, the controller 1650 may determine whether or not the printing apparatus 1600 and the user device 1700 are present within the preset distance by using various methods.

In one embodiment, the controller 1650 may determine the distance between the printing apparatus 1600 and the user device 1700 by using the strength of communication signals that are used by the printing apparatus 1600 and the user device 1700 in order to perform communication.

For example, the controller 1650 may check the distance between the printing apparatus 1600 and the user device 1700 by using a beacon. As a specific example, the printing apparatus 1600 may include a beacon, a beacon is attached to the printing apparatus 1600, or a beacon is located within a distance adjacent to the printing apparatus 1600. A beacon may broadcast a specific signal. In this case, when the user device 1700 is located within a predetermined distance from the beacon, the user device 1700 may receive the specific signal. In response to the specific signal, the user device 1700 may provide a response signal to the beacon or the printing apparatus 1600. When the beacon or printing apparatus 1600 acquires the response signal, the controller 1650 may determine that the user device 1700 is located within the predetermined distance. Furthermore, in a more specific example, when the user device 1700 receives the specific signal, the user device 1700 may acquire the received signal strength information of the specific signal by using the specific signal, and thus the response signal may include the received signal strength information. In this case, the controller 1650 may determine the distance between the printing apparatus 1600 and the user device 1700 by using the received signal strength information.

As another example, the controller 1650 may determine the distance between the printing apparatus 1600 and the user device 1700 by using a Wi-Fi signal. For example, at least Wi-Fi access points may be located near the printing apparatus 1600 or inside the printing apparatus 1600, and the controller 1650 may determine the distance between the printing apparatus 1600 and the user device 1700 by using Wi-Fi signals generated in the Wi-Fi access points. As an example, the controller 1650 may determine the location of the printing apparatus 1600 and the location of the user device 1700 by using a triangulation technique, a fingerprint technique or the like, and may determine the distance between the printing apparatus 1600 and the user device 1700 via the determined locations.

In another embodiment, the controller 1650 may determine the distance between the printing apparatus 1600 and the user device 1700 by using GPS signals. For example, the controller 1650 may acquire the GPS signals of the user device 1700 from the user device 1700. The controller 1650 may determine the distance between the printing apparatus 1600 and the user device 1700 by using the GPS signals of the user device 1700. It will be apparent that the controller 1650 may acquire the GPS signals of the printing apparatus 1600. In this case, the controller 1650 may determine the distance between the printing apparatus 1600 and the user device 1700 by determining the location of the printing apparatus 1600 using the GPS signals of the printing apparatus 1600 and also determining the location of the user device 1700 using the GPS signals of the user device 1700.

Furthermore, the controller 1650 may generate a unique identification image including the error information and solution information when the user device 1700 is present within a preset distance at step 2305. For example, the controller 1650 may acquire solution information corresponding to a paper jam error from the memory 1630 when the paper jam error occurs. In this case, when it is determined that the user device 1700 is present within a preset distance from the printing apparatus 1600, the controller 1650 may generate a QR code including solution information (e.g., moving image access information) corresponding to the paper jam error, as shown in FIG. 18. Accordingly, the user may check a moving image adapted to solve the paper jam error via the operation of reading the QR code by using the user device 1700.

In contrast, when the user device 1700 is not present within the preset distance from the printing apparatus 1600 that will perform a printing operation, the controller 1650 may transmit the error information and solution information at step 2306. In other words, the reason for this is that a user cannot appropriately utilize the above-described QR code despite the display of the above-described QR code via the display 1640 of the printing apparatus 1600 in the case where the user device 1700 is not located near the printing apparatus 1600. In this case, the controller 1650 may directly transmit the solution information to the user device 1700 over the network N. Alternatively, the controller 1650 may report error occurrence to the server 1500, and the server 1500 may transmit appropriate solution information corresponding to error information having occurred in the printing apparatus 1600 to the user device 1700.

Meanwhile, the type of solution information that is provided according to the knowledge level of a user, the authority of the user, the preference of the user, and/or the like may vary. For example, when the user of the corresponding printing apparatus is a general employee, solution information including moving image access information may be provided. Alternatively, for example, when the user of the corresponding printing apparatus is the administrator of the printing apparatus, solution information including only instructions on how to solve an error state may be provided. In this case, the controller 1650 may determine the knowledge level of a user, the authority of the user, the preference of the user, and/or the like by using identification information allocated to each user device 1700. In this case, one or more pieces of above-described solution information may be selected and provided according to the identification information of the user device 1700.

An overall process of providing error solution information among a plurality of printing apparatuses 1600, a server 1500 and a user device 1700 in a printing apparatus control system according to embodiments of the present application will be described with reference to FIGS. 24 to 28 below.

As an example, as described in conjunction with the above-described embodiments, the user device 1700 may acquire solution information about an error via the printing apparatus 1600.

Figure 24:
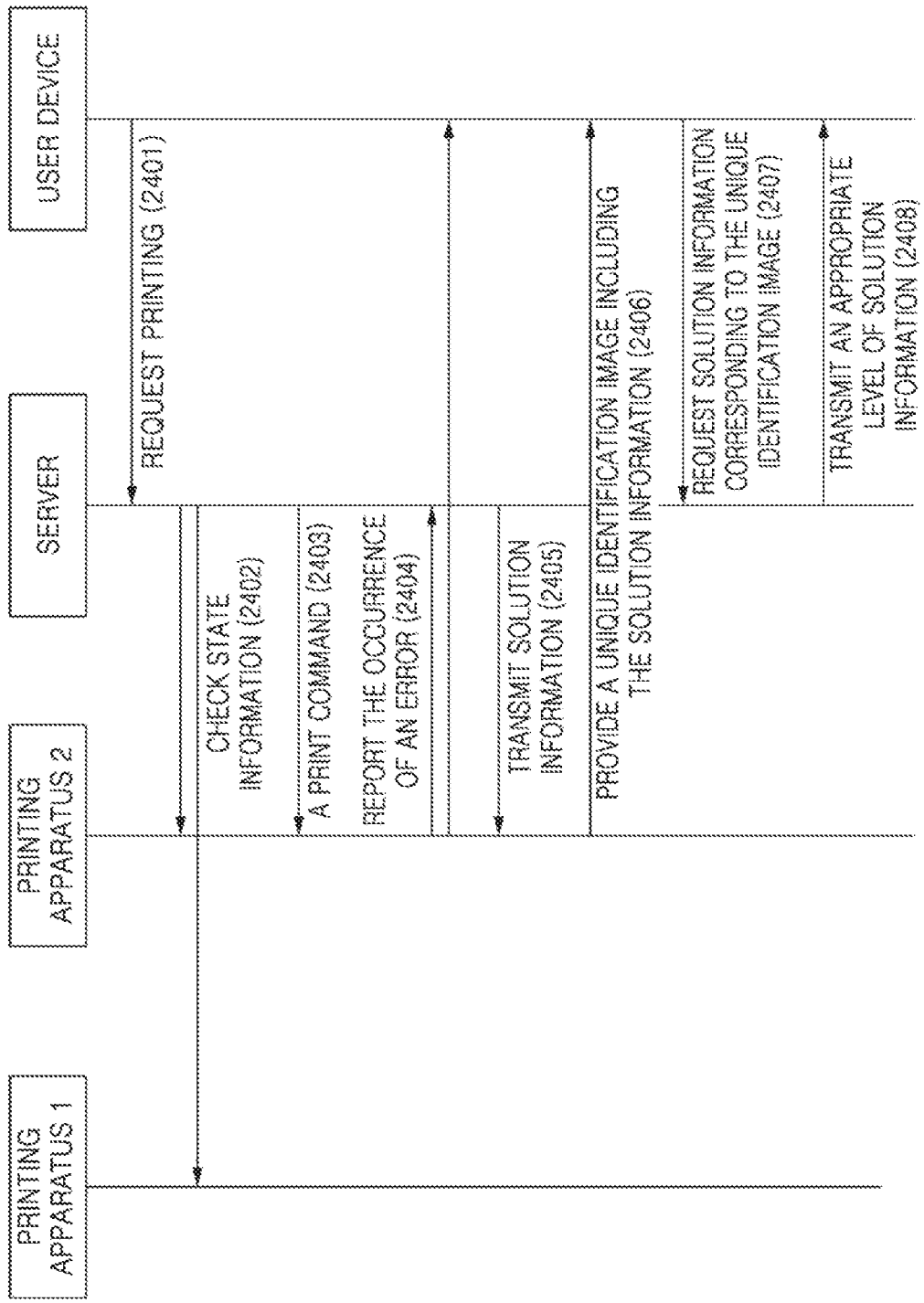
FIGS. 24 to 28 are views illustrating an overall process in which error solution information is provided according to embodiments of the present application as an example.

Referring to FIG. 24, the server 1500 may receive a print request from the user device 1700 at step 2401, and the server 1500 may determine the state information of a plurality of printing apparatuses within a network N at step 2402.

In this case, the state information may include the operation state and printing setting information of first and second printing apparatuses. For example, the server 1500 may determine printing setting information included in a print request received from the user device 1700, and may select one printing apparatus appropriate for printing from the first and second printing apparatuses based on the printing setting information. For example, the server 1500 may transfer a print command to the second printing apparatus at step 2403.

Figure 26:
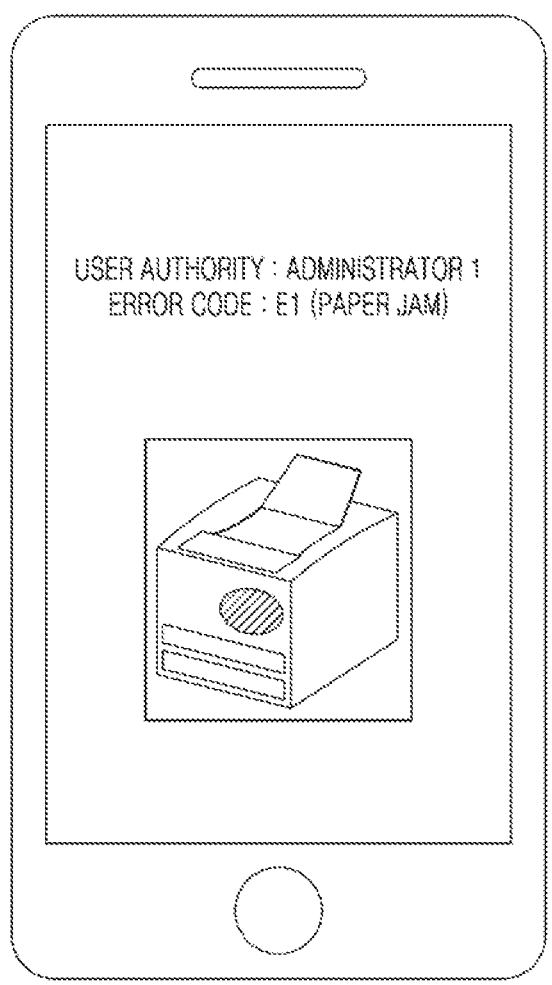
Figure 27:
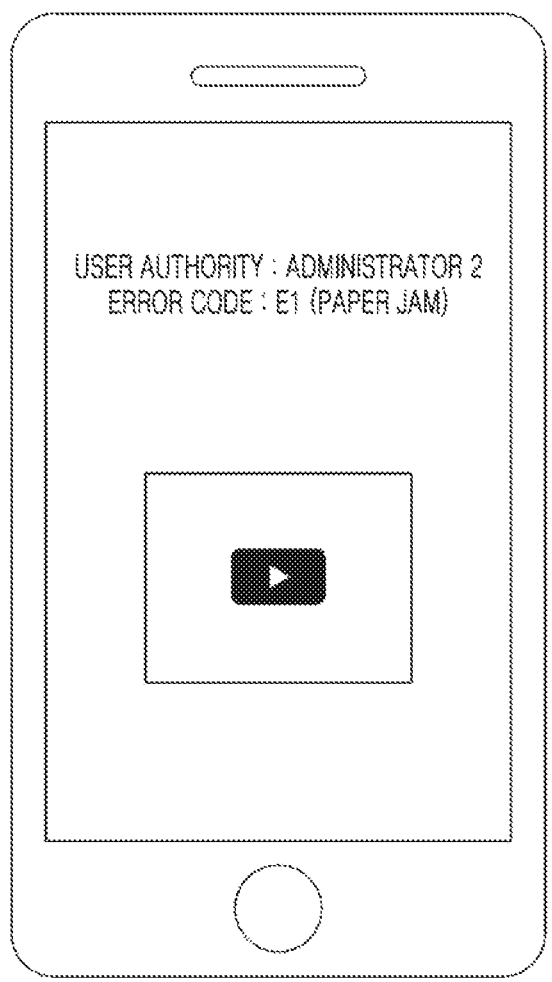
Figure 28:
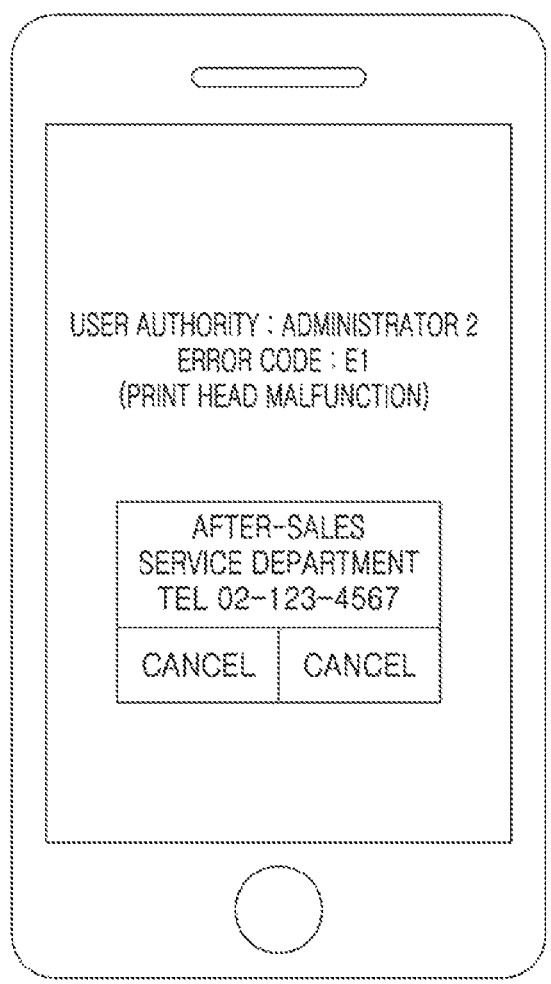

In this case, when at least one error occurs during the performance of a printing operation, the second printing apparatus may report error occurrence to the server 1500 and/or the user device 1700 at step 2404. The server 1500 may search for solution information corresponding to the error occurrence reported by the second printing apparatus and transmit solution information to the second printing apparatus at step 2405. In this case, the second printing apparatus may generate a unique identification image including the solution information acquired from the server 1500 and provide the unique identification image to the user device 1700 at step 2406. For example, the unique identification image may be displayed on the display of the second printing apparatus and the user device 1700 may request solution information corresponding to the unique identification image from the server 1500 at step 2407. For example, the unique identification image may include image information intuitively indicative of an error state and a solution method, moving image access information adapted to solve the error state, and the contact information of an after-sales-service department, and/or the like. In this case, when a user reads the unique identification image by using the user device 1700, the server 1500 may provide appropriate solution information via the user device 1700, as shown in FIGS. 26 to 28, at step 2408.

As another example, the user device 1700 may receive solution information about an occurred error directly from the server 1500.

Figure 25:
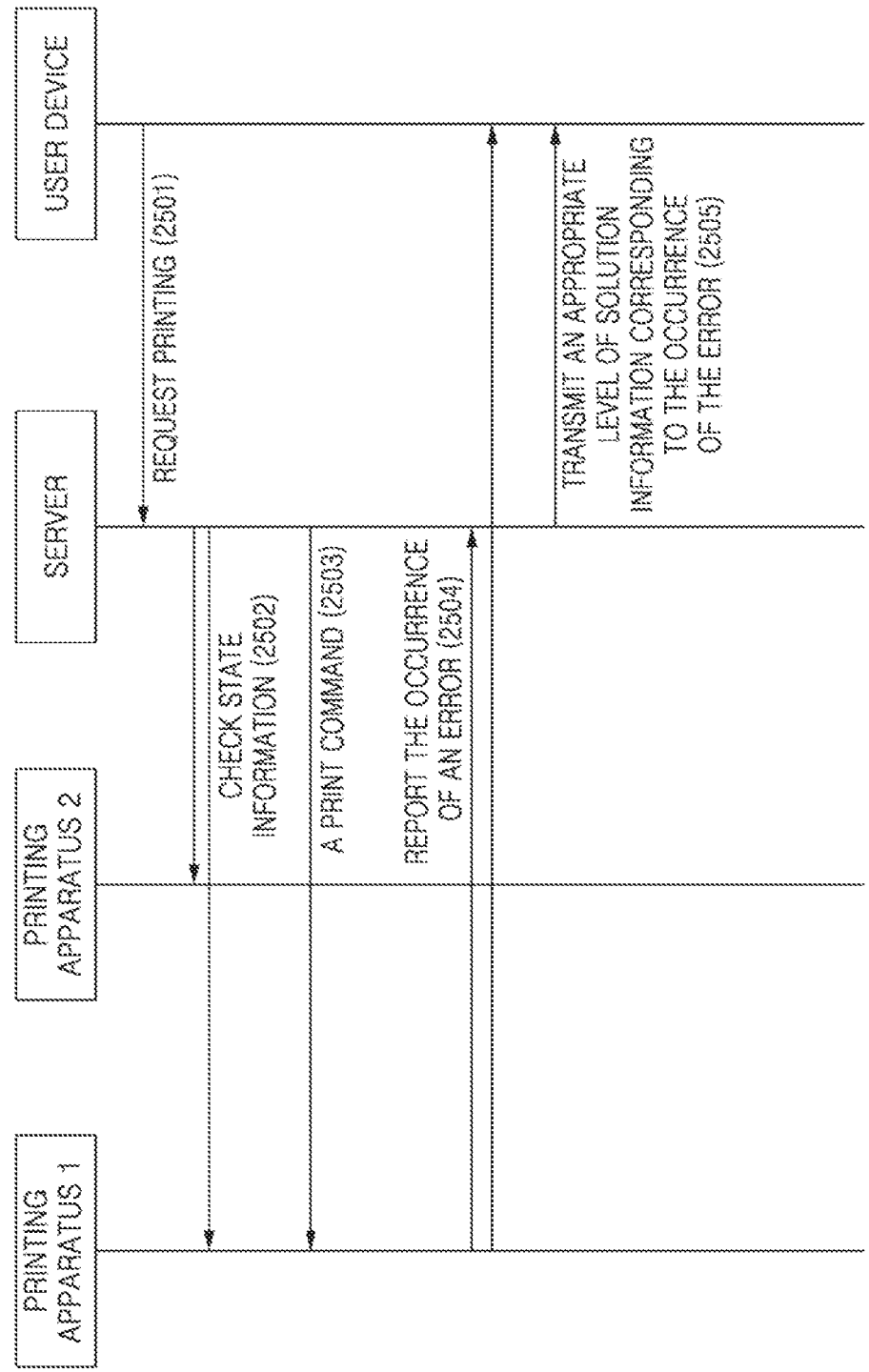

Referring to FIG. 25, the server may receive a print request from the user device 1700 at step 2501, and the server 1500 may check the state information of the plurality of printing apparatuses within the network N at step 2502.

In this case, the state information may include the operation states and printing setting information of the first and second printing apparatuses, and the like. For example, the server 1500 may check printing setting information included in a print request received from the user device 1700, and may select one printing apparatus appropriate for printing from the first and second printing apparatuses based on the printing setting information. For example, the server 1500 may transfer a print command to the first printing apparatus at step 2503.

In this case, when at least one error occurs during a printing operation, the second printing apparatus may report error occurrence to the server 1500 and/or the user device 1700 at step 2504. The server 1500 may search for solution information corresponding to the error occurrence reported by the second printing apparatus and directly transmit the solution information to the user device 1700 at step 2505. For example, as shown in FIGS. 26 to 28, the server 1500 may provide appropriate solution information onto the user device 1700 at step 2505.

Although the embodiments of the methods for providing error information and/or solution information corresponding to the error so that a user can easily solve an error state having occurred in the printing apparatus 1600, the above-described embodiments may be utilized in the same manner or a similar manner in order to provide information related to maintenance so that a user can check information related to the maintenance of the printing apparatus in real time and prepare for error occurrence before the occurrence of an error in the printing apparatus 1600.

The information related to maintenance may be, for example, not only information related to the replacement time of various types of consumables such as paper exhaustion, ink ribbon replacement, toner replacement, print head wear, roller wear, etc. but also information related to the state information of the consumables such as the remaining amount of paper, the remaining amount of ink, etc. In this case, the information related to the replacement time of various types of consumables may be previously stored in the memory 1630, and the state information of the consumables may be information detected from the above-described sensor 1620.

As an example, the server 1500 may receive a message requesting information related to the maintenance of the printing apparatus from a user. For example, a user may request information about the remaining amount of paper via an application executed on the user terminal 1700. In this case, the server 1500 may acquire information about the remaining amount of paper from the controller 1650 of the printing apparatus, and may transmit a message including the information about the remaining amount of paper to the user terminal 1700. In the message, the information related to the maintenance of the printing apparatus may include not only maintenance information but also solution information for maintenance. For example, the server 1500 may transmit a message including information about the remaining amount of paper, information about an order for paper, a paper loading method, and/or the like to the display 1640 of the printing apparatus or the terminal 1700 of a user.

As another example, the server 1500 may provide information related to the maintenance of the printing apparatus to a user based on the state information of the printing apparatus collected from the memory 1630 and/or sensor 1620 of the printing apparatus.

For example, the server 1500 may transmit a message including information about the remaining amount of paper, information about an order for paper, a paper loading method, and the like via an application executed on the user terminal 1700 when it is determined by the controller 1650 of the printing apparatus that the remaining amount of paper is equal to or lower than a preset reference. Alternatively, the server 1500 may display the message on the display 1640 of the printing apparatus.

Furthermore, e.g., the server 1500 may transmit a message, including printing apparatus head replacement time information, printing apparatus head order information, printing apparatus head mounting/demounting methods, and/or the like, via an application executed on the user terminal when the replacement time of the head of the printing apparatus falls within a preset reference range based on information about the replacement time of the head of the printing apparatus head stored in the controller 1650 of the printing apparatus or the server 1500. Alternatively, the server 1500 may display the message on the display 1640 of the printing apparatus.

Meanwhile, as described above, the type of information displayed on the display 1640 of the printing apparatus or information related to the maintenance of the printing apparatus transmitted to the user terminal 1700 may be various. For example, as described above, one or more of text information, image information, URL information, the contact information of a related department, and moving image access information may be included. Alternatively, for example, a unique identification image including the information may be displayed on the display 1640 or user terminal 1700.

The methods according to the embodiments may be implemented in the form of program instructions executable by various computer means, and may be stored on a computer-readable storage medium. The computer-readable storage medium may include program instructions, data files, and data structures solely or in combination. Program instructions recorded on the storage medium may have been specially designed and configured for the present invention, or may be known to or available to those who have ordinary knowledge in the field of computer software. Examples of the computer-readable storage medium include all types of hardware devices specially configured to record and execute program instructions, such as magnetic media, such as a hard disk, a floppy disk, and magnetic tape, optical media, such as compact disk (CD)-read only memory (ROM) and a digital versatile disk (DVD), magneto-optical media, such as a floptical disk, ROM, random access memory (RAM), and flash memory. Examples of the program instructions include machine code, such as code created by a compiler, and high-level language code executable by a computer using an interpreter. These hardware devices may be configured to operate as one or more software modules in order to perform the operation of the present invention, and the vice versa.

While the embodiments have been illustrated with reference to the limited embodiments and drawings, those skilled in the art may make various changes and modifications based on the foregoing description. For example, appropriate results can be achieved even when the aforementioned technologies are performed in order different from that of the described method and/or even when the components of a system, structure, apparatus, circuit, or the like are coupled or combined in a form different from that of the described method or replaced with other components or equivalents.

Therefore, other implementations, other embodiments, and equivalents to the appended claims may fall within the scope of the following appended claims.

The above-described embodiments are intended for illustrative purposes. It will be understood that those having ordinary knowledge in the art to which the present invention pertains can easily make modifications and variations without changing the technical spirit and essential features of the present invention. Therefore, the above-described embodiments are illustrative and are not limitative in all aspects. For example, each component described as being in a single form may be practiced in a distributed form. In the same manner, components described as being in a distributed form may be practiced in an integrated foam.

The scope of protection pursued via the present specification should be defined by the attached claims, rather than the above-described detailed description. All modifications and variations that can be derived from the meanings, scopes and equivalents of the claims should be construed as falling within the scope of the present invention.

The invention claimed is:

1. A printing apparatus supporting USB type-C, the printing apparatus comprising:
   a USB type-C interface configured to support a connection with an external device;
   a printing performer configured to perform printing; and
   a controller configured to control supply of power to the external device;
   wherein the controller checks a reception power received from an external power source, predicts an estimated power consumption of at least one of the printing apparatus and the external device, determines a supply power to be transmitted to the external device based on the reception power and the estimated power consumption, and transmits the supply power to the external device via the USB type-C interface,
   wherein the controller determines the supply power based on at least one of a minimum amount of power required by the printing apparatus and priorities of the printing apparatus and the external device, the reception power, and the estimated power consumption.

2. The printing apparatus of claim 1, wherein the controller determines a value, obtained by subtracting the estimated power consumption of the printing apparatus from the reception power, to be the supply power.

3. The printing apparatus of claim 1, wherein the controller determines the estimated power consumption of the external device to be the supply power when the estimated power consumption of the external device is equal to or lower than the reception power.

4. The printing apparatus of claim 1, wherein the controller determines a value, obtained by subtracting the minimum amount of power from the reception power, to be the supply power when a value obtained by adding the minimum amount of power and the estimated power consumption of the external device to each other is larger than the reception power.

5. The printing apparatus of claim 1, wherein the controller:
   checks the priorities of the printing apparatus and the external device when a value obtained by adding the estimated power consumption of the printing apparatus and the estimated power consumption of the external device to each other is larger than the reception power; and
   determines a value, obtained by subtracting the estimated power consumption of the printing apparatus from the reception power, to be the supply power when the printing apparatus has a higher priority, and determines the estimated power consumption of the external device to be the supply power when the external device has a higher priority.

6. The printing apparatus of claim 1, wherein the controller:
   checks priorities of the printing apparatus and the external device when a value obtained by adding the estimated power consumption of the printing apparatus and the estimated power consumption of the external device to each other is larger than the reception power; and
   determines a value, obtained by subtracting the estimated power consumption of the printing apparatus from the reception power, to be the supply power when the printing apparatus has a higher priority, and determines a smaller value of a value obtained by subtracting the minimum amount of power from the reception power and the estimated power consumption of the external device to be the supply power when the external device has a higher priority.

7. A method for supplying power by using a printing apparatus supporting USB type-C, the method comprising:
   checking a reception power received from an external power source by the printing apparatus;
   predicting an estimated power consumption of at least one of the printing apparatus and an external device connected to the printing apparatus;
   determining a supply power to be transmitted to the external device by the printing apparatus based on the reception power and the estimated power consumption; and
   transmitting the supply power to the external device via a USB type-C connection between the printing apparatus and the external device,
   wherein determining the supply power comprises determining the supply power based on at least one of a minimum amount of power required by the printing apparatus and priorities of the printing apparatus and the external device, the reception power, and the estimated power consumption.

8. The method of claim 7, wherein determining the supply power comprises determining a value, obtained by subtracting the estimated power consumption of the printing apparatus from the reception power, to be the supply power.

9. The method of claim 7, wherein determining the supply power comprises determining the estimated power consumption of the external device to be the supply power when the estimated power consumption of the external device is equal to or lower than the reception power.

10. The method of claim 7, wherein determining the supply power comprises determining a value, obtained by subtracting the minimum amount of power from the reception power, to be the supply power when a value obtained by adding the minimum amount of power and the estimated power consumption of the external device to each other is larger than the reception power.

11. The method of claim 7, wherein determining the supply power comprises:
   checking the priorities of the printing apparatus and the external device when a value obtained by adding the estimated power consumption of the printing apparatus and the estimated power consumption of the external device to each other is larger than the reception power; and
   determining a value, obtained by subtracting the estimated power consumption of the printing apparatus from the reception power, to be the supply power when the printing apparatus has a higher priority, and determining the estimated power consumption of the external device to be the supply power when the external device has a higher priority.

12. The method of claim 7, wherein determining the supply power comprises:
   checking priorities of the printing apparatus and the external device when a value obtained by adding the estimated power consumption of the printing apparatus and the estimated power consumption of the external device to each other is larger than the reception power; and determining a value, obtained by subtracting the estimated power consumption of the printing apparatus from the reception power, to be the supply power when the printing apparatus has a higher priority, and determining a smaller value of a value obtained by subtracting the minimum amount of power from the reception power and the estimated power consumption of the external device to be the supply power when the external device has a higher priority.

13. A computer-readable non-transitory storage medium having stored therein a program for performing the method set forth in claim 7.

* * * * *